US009516667B2

(12) United States Patent
Liu et al.

(10) Patent No.: US 9,516,667 B2
(45) Date of Patent: *Dec. 6, 2016

(54) SDMA MULTI-DEVICE WIRELESS COMMUNICATIONS

(71) Applicant: Marvell World Trade Ltd., St. Michael (BB)

(72) Inventors: Yong Liu, Campbell, CA (US); Raja Banerjea, Sunnyvale, CA (US); Harish Ramamurthy, Sunnyvale, CA (US); Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/585,000

(22) Filed: Dec. 29, 2014

(65) Prior Publication Data

US 2015/0117383 A1 Apr. 30, 2015

Related U.S. Application Data

(63) Continuation of application No. 12/850,529, filed on Aug. 4, 2010, now Pat. No. 8,923,217.

(60) Provisional application No. 61/324,254, filed on Apr. 14, 2010, provisional application No. 61/252,480, (Continued)

(51) Int. Cl.
*H04W 4/00* (2009.01)
*H04B 7/212* (2006.01)
(Continued)

(52) U.S. Cl.
CPC ........ *H04W 72/1263* (2013.01); *H04L 1/1685* (2013.01); *H04L 1/1887* (2013.01);
(Continued)

(58) Field of Classification Search
CPC ............... H04W 72/1263; H04W 74/0816; H04W 16/28; H04W 28/04; H04W 76/064; H04W 76/068; H04W 28/26; H04L 1/1685; H04L 1/1887; H04L 2001/0093

See application file for complete search history.

(56) References Cited

U.S. PATENT DOCUMENTS 7,352,718 B1 4/2008 Perahia
8,199,723 B2 6/2012 Li
(Continued)

FOREIGN PATENT DOCUMENTS

JP 2007517474 T 6/2007
JP 2009164751 A 7/2009
WO WO2007117949 A1 10/2007

OTHER PUBLICATIONS

"DRAFT Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band," IEEE Std. 802.11g (2003), 69 pages.

(Continued)

*Primary Examiner* — Lonnie Sweet

(57) ABSTRACT

The present disclosure includes systems and techniques relating to wireless communications. A described technique, for example, includes transmitting a multi-user frame, in a frequency band, that concurrently provides data via spatially steered streams to a group of wireless communication devices; monitoring for acknowledgements, in the frequency band, to respective portions of the multi-user frame; detecting a lack of reception of an expected acknowledgement from a first device of the wireless communication devices; and transmitting, based on the lack of reception of the expected acknowledgement, a signal in the frequency band to prevent a transmission from a wireless communication device that is separate from the group of wireless communication devices, and to control transmission of an acknowledgement from a second device of the wireless communication devices.

20 Claims, 25 Drawing Sheets

Related U.S. Application Data filed on Oct. 16, 2009, provisional application No. 61/251,411, filed on Oct. 14, 2009, provisional application No. 61/242,928, filed on Sep. 16, 2009, provisional application No. 61/241,826, filed on Sep. 11, 2009, provisional application No. 61/240,933, filed on Sep. 9, 2009, provisional application No. 61/233,428, filed on Aug. 12, 2009.

(51) Int. Cl.
| | | |
|---|---|---|
| H04L 12/28 | (2006.01) | |
| H04W 72/12 | (2009.01) | |
| H04L 1/16 | (2006.01) | |
| H04L 1/18 | (2006.01) | |
| H04W 28/26 | (2009.01) | |
| H04W 76/06 | (2009.01) | |
| H04L 1/00 | (2006.01) | |
| H04W 16/28 | (2009.01) | |
| H04W 28/04 | (2009.01) | |
| H04W 74/08 | (2009.01) | |

(52) U.S. Cl.
CPC ....... *H04L2001/0093* (2013.01); *H04W 16/28* (2013.01); *H04W 28/04* (2013.01); *H04W 28/26* (2013.01); *H04W 74/0816* (2013.01); *H04W 76/064* (2013.01); *H04W 76/068* (2013.01)

(56) References Cited

U.S. PATENT DOCUMENTS

| | | | | |
|---|---|---|---|---|
| 8,923,217 | B2* | 12/2014 | Liu | H04L 1/1685 370/329 |
| 2003/0133469 | A1 | 7/2003 | Brockmann | |
| 2005/0138199 | A1* | 6/2005 | Li | H04W 74/0891 709/236 |
| 2005/0147023 | A1* | 7/2005 | Stephens | H04B 7/0408 370/203 |
| 2007/0126612 | A1 | 6/2007 | Miller | |
| 2008/0133790 | A1* | 6/2008 | Sharma | H04L 1/1685 710/30 |
| 2008/0144493 | A1* | 6/2008 | Yeh | H04W 52/50 370/230 |
| 2009/0059827 | A1* | 3/2009 | Liu | H04W 76/048 370/311 |
| 2009/0196364 | A1* | 8/2009 | Nakajima | H04W 28/065 375/260 |
| 2011/0044298 | A1* | 2/2011 | Wentink | H04L 1/1621 370/336 |

OTHER PUBLICATIONS

"Part 11: Wireless LAN Medium Access Control (MAC) and Physical Layer (PHY) specifications: High-Speed Physical Layer in the 5 GHz Band," IEEE Std. 802.11a (1999), 91 pages.

"Part II: Wireless LAN Medium Access Control (MAC) and Physical Layer (PHY) specifications: Higher-Speed Physical Layer Extension in the 2.4 GHz Band," IEEE Std. 802.11b (1999), 96 pages.

"TGn Sync Proposal Technical Specification," IEEE Std. 802.11n (2005), 131 pages.

Garcia, Larrode, M., Authorized Officer, European Patent Office, PCT International Application No. PCT/US2010/044457, in International Search Report, mailed Nov. 10, 2010, 16 pages.

"Information technology—Telecommunications and information exchange between systems—Local and metropolitan networks—specific requirements. Part 11: Wireless LAN Medium Access Control (MAC) and Physical Layer (PHY) Specifications", IEEE Std. 802.11n, Oct. 29, 2009, 535 pages.

Kim et al., "Error Recovery Scheme for Scheduled Ack," IEEE, 802.11-10/0637r0, May 19, 2010, 13 pages.

Liu, Yong, et al., "Signaling for Multi-Dimension Wireless Resource Allocation," U.S. Appl. No. 12/758,709, filed Apr. 12, 2010, to be published by the USPTO, 67 pages.

Sidelnikov et al., Fragmentation/Aggregation Scheme for Throughput Enhancement of IEEE, 802,11n WLAN, 2002, 9 pages.

Singh et al., "Enhanced Power Saving in Next Generation Wireless LANs", Sep. 2006, 2006 IEEE 64th Vehicular Technology Conference, Montreal, Canada, 5 pages.

Stacey et al., "DL MU-MIMO ack protocol," IEEE, 802.11-09/1172r0, Nov. 16, 2009, 9 pages.

Zhang et al., "Exploiting Multi-Antennas for Opportunistic Spectrum Sharing in Cognitive Radio Networks," IEEE The 18th Annual IEEE International Symposium on Personal, Indoor and Mobile Radio Communications (PIMRC), 2007, 5 pages.

Zhang, Hongyuan et al., "Sounding and Steering Protocols for Wireless Communications", U.S Appl. No. 12/750,636, filed Mar. 30, 2010, to be published by the USPTO, 64 pages.

Gong et al., "DLM MU MIMO Error Handling and Simulation Results", IEEE 802.11-10/0324R0 Mar. 15, 2010, pp. 1-22.

European Application No. 10 743 297.3, Communication pursuant to Article 94(3) EPC, dated Jan. 29, 2015, 6 pages.

\* cited by examiner

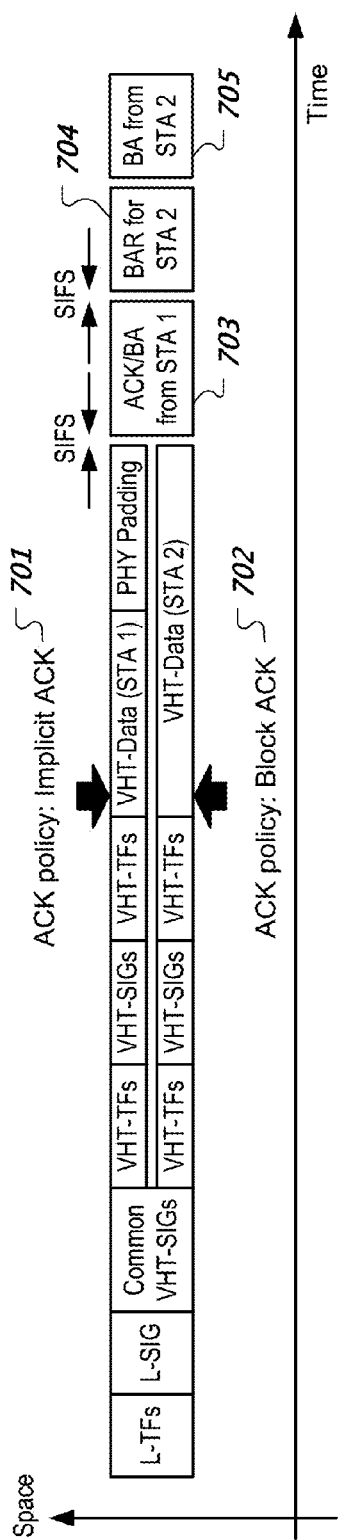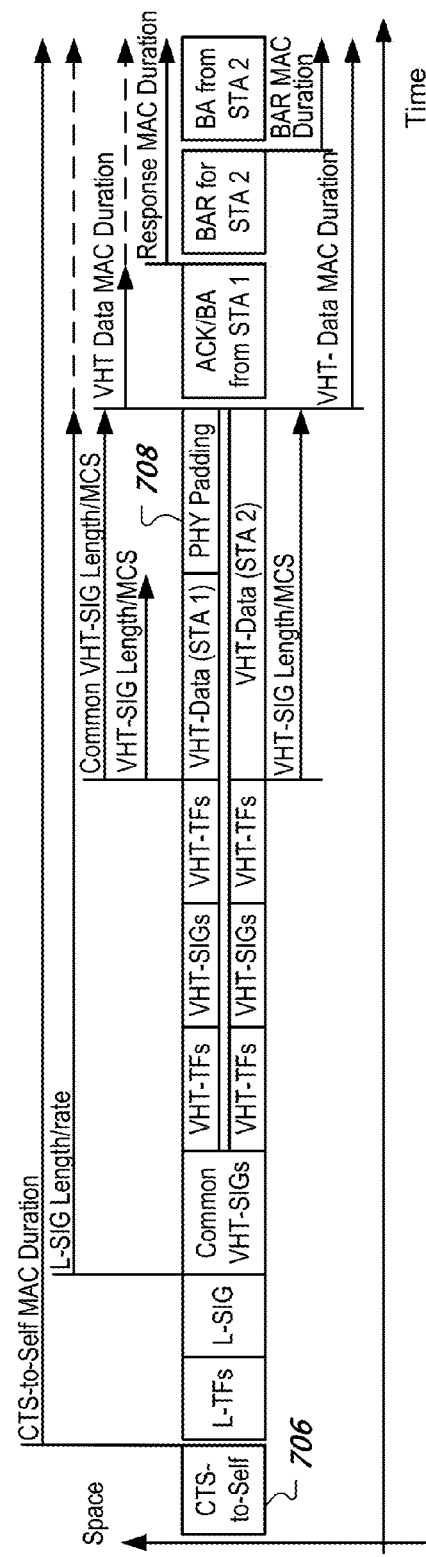
Fig. 7A
Fig. 7B

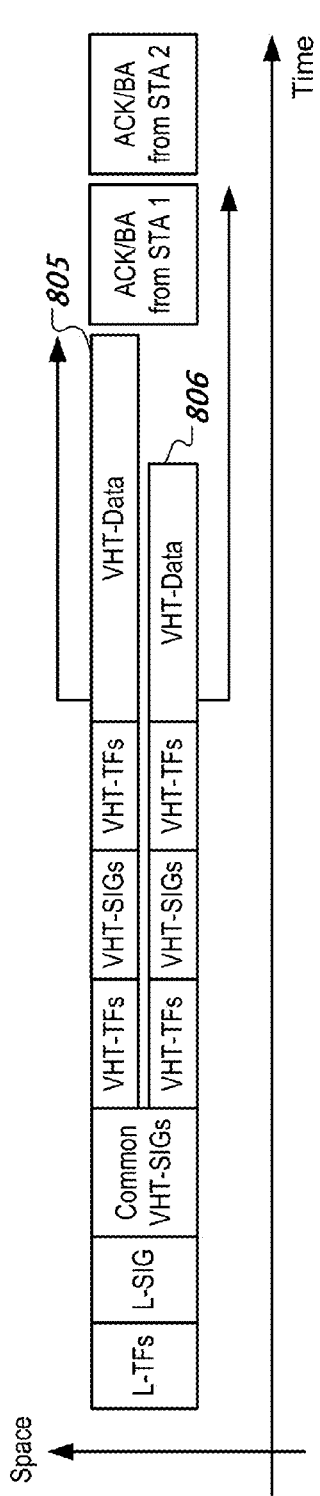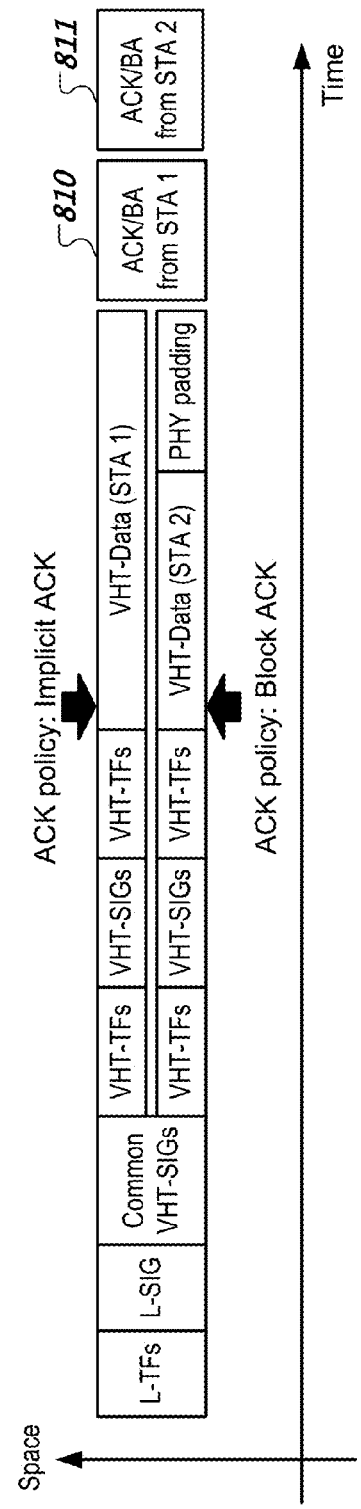

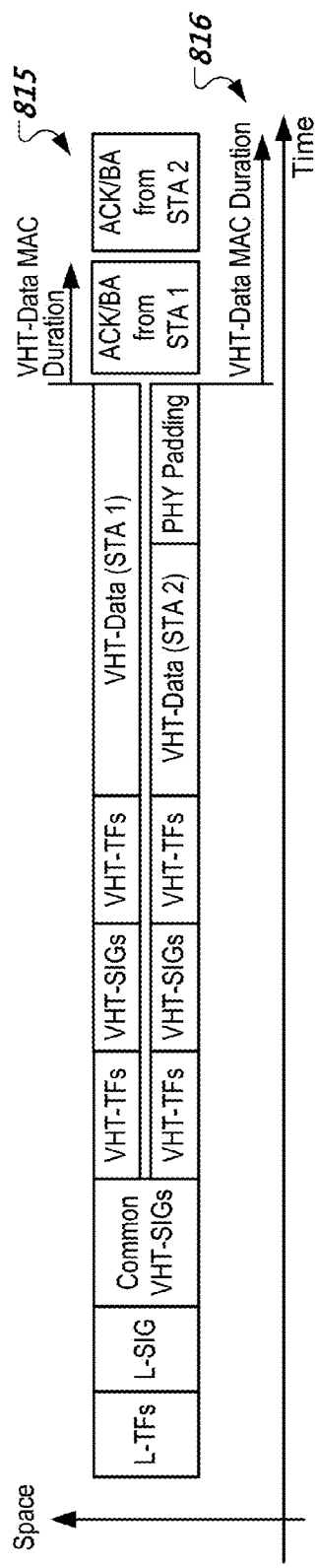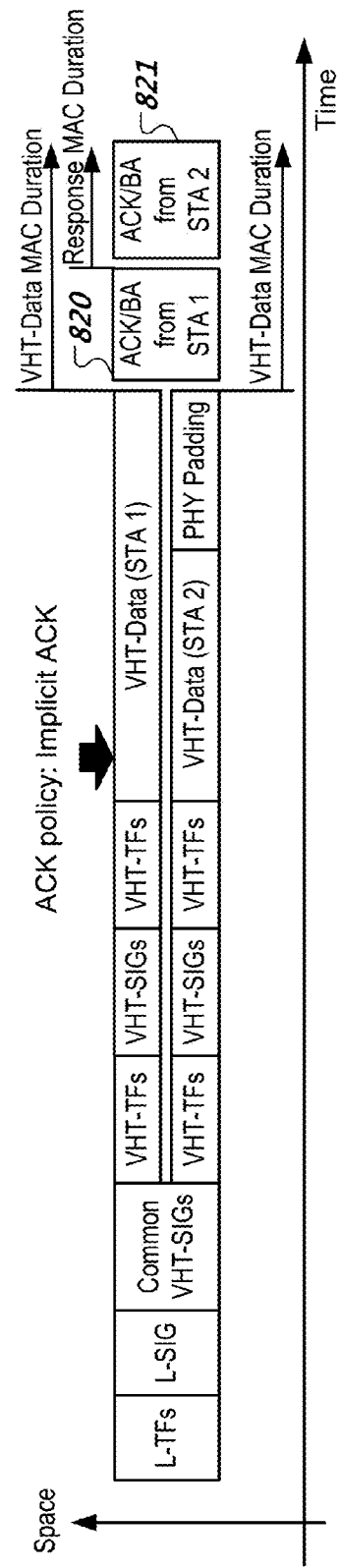
Fig. 8C
Fig. 8D

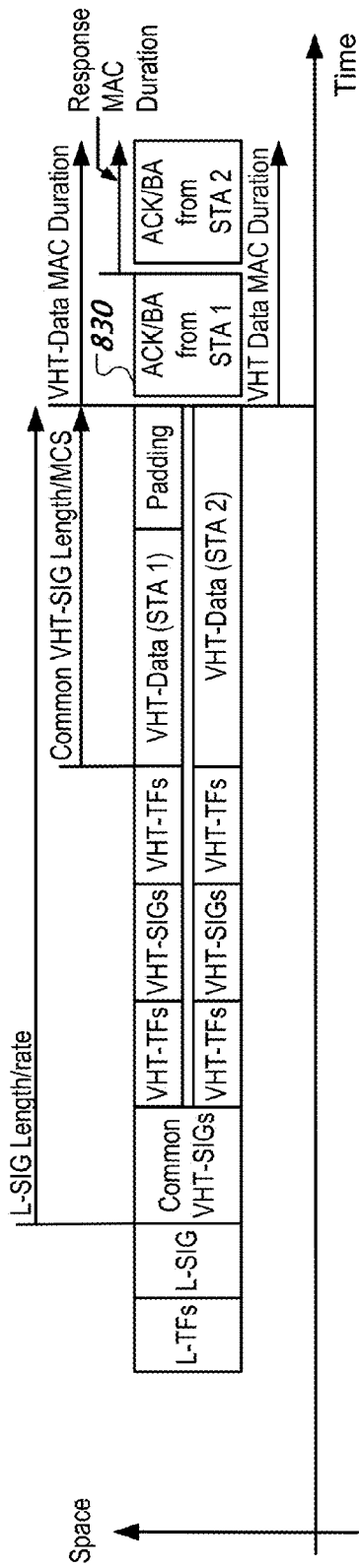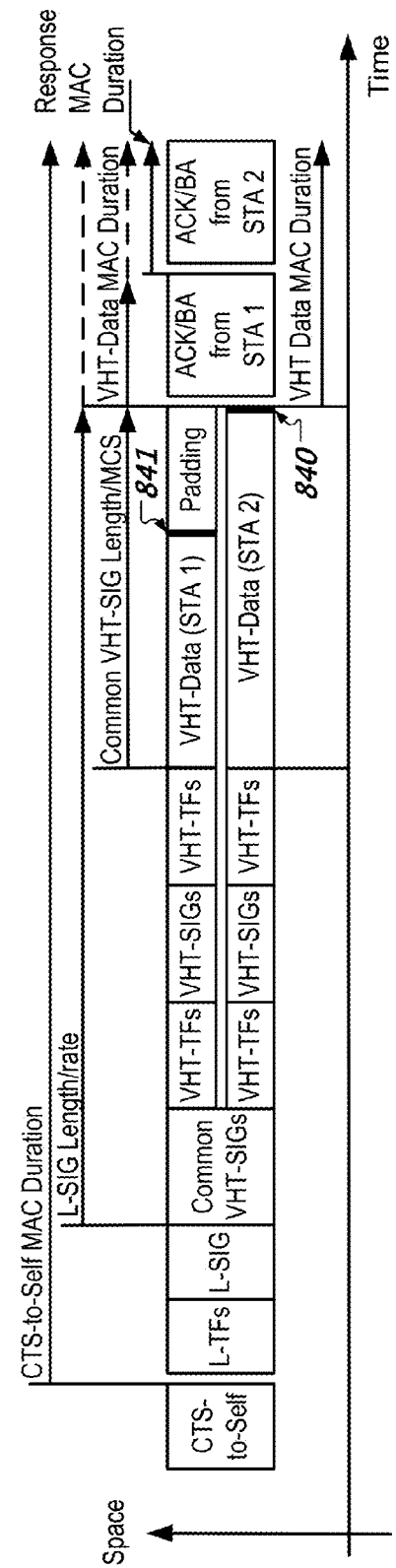

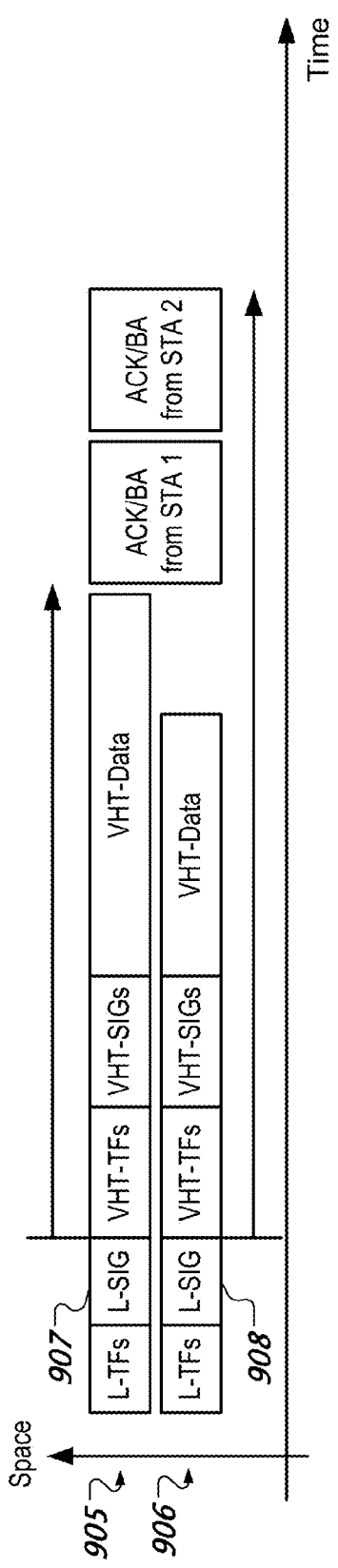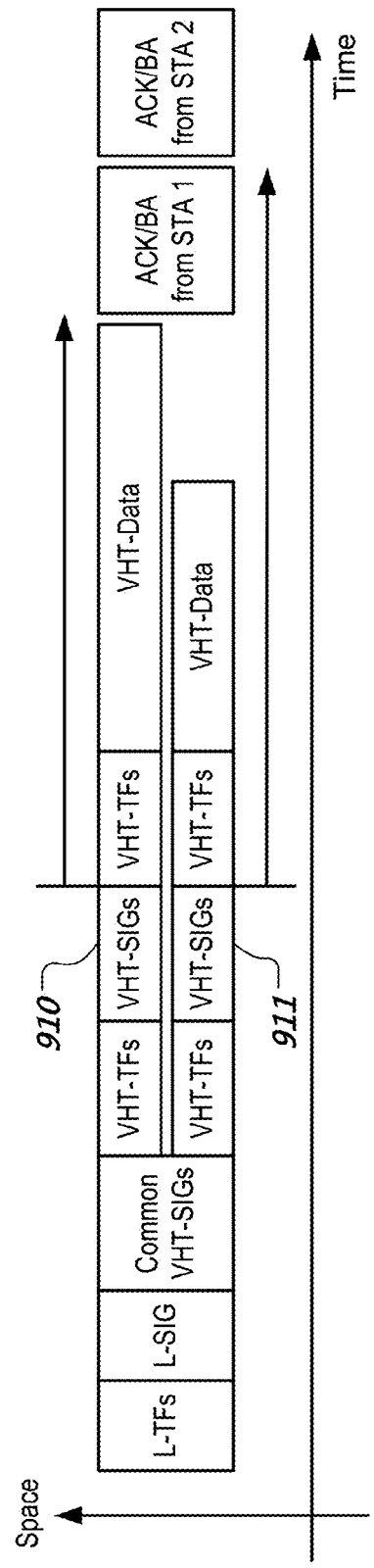
Fig. 9A
Fig. 9B

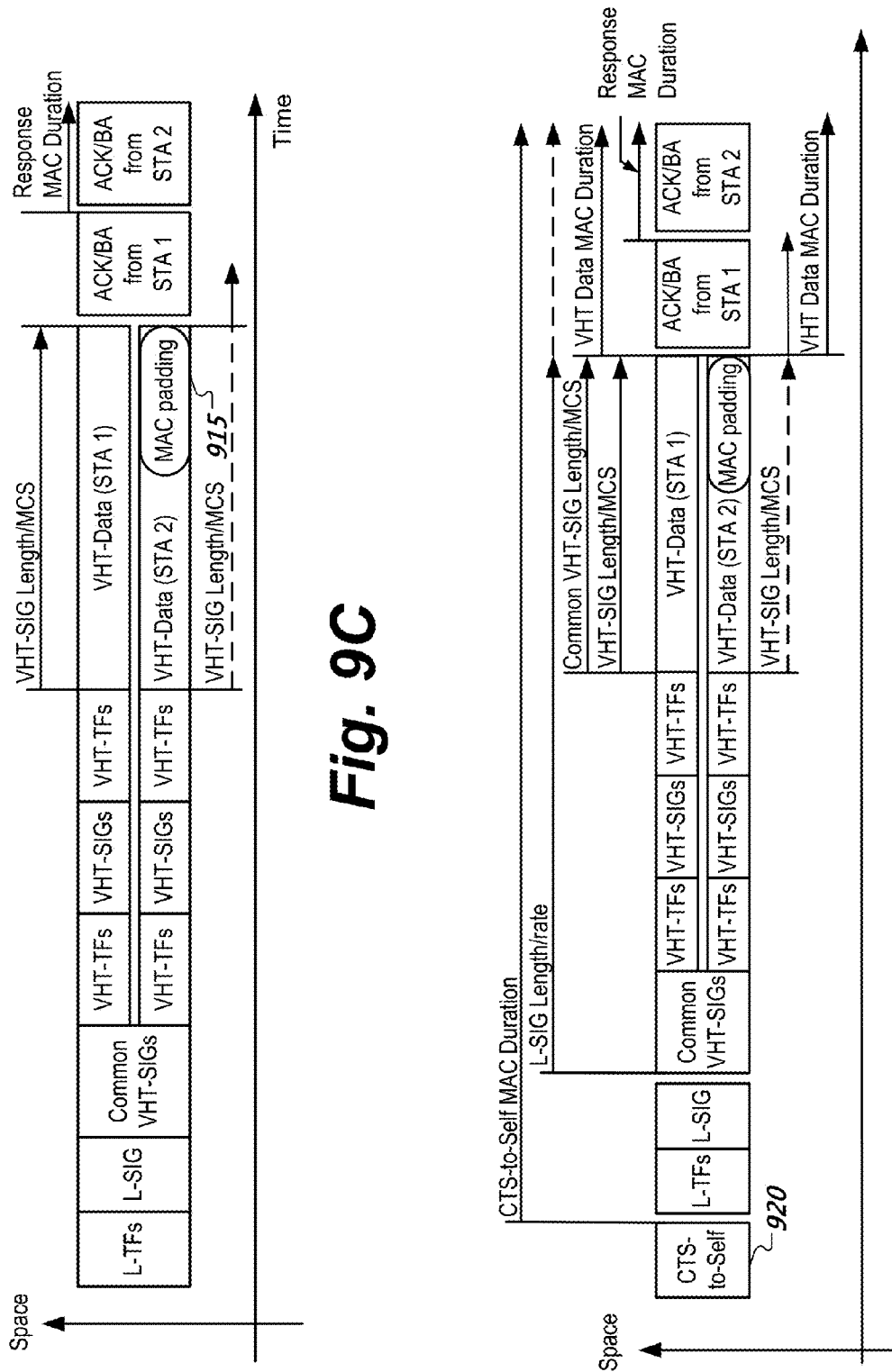

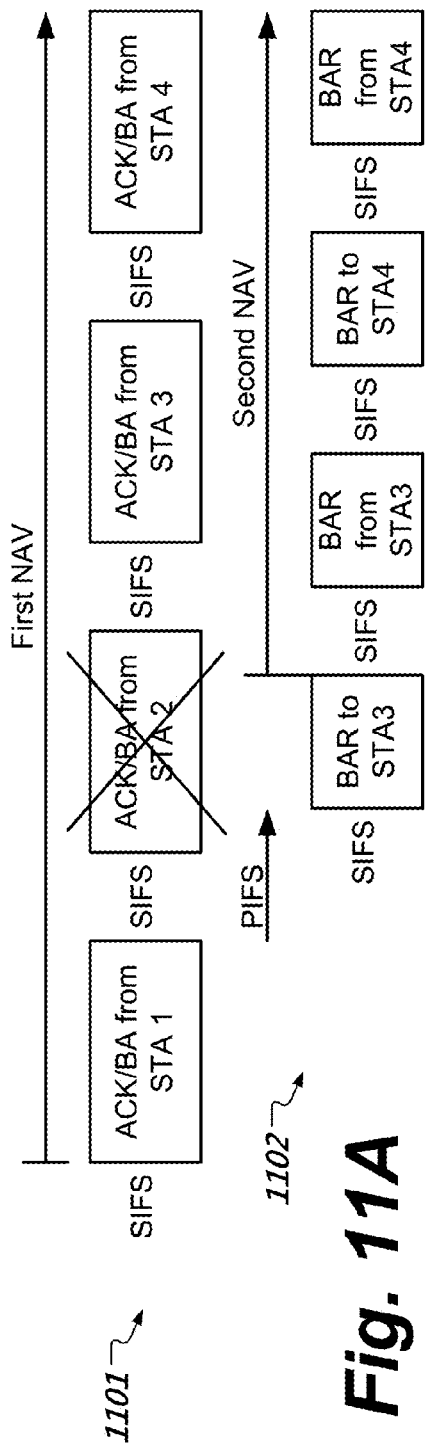
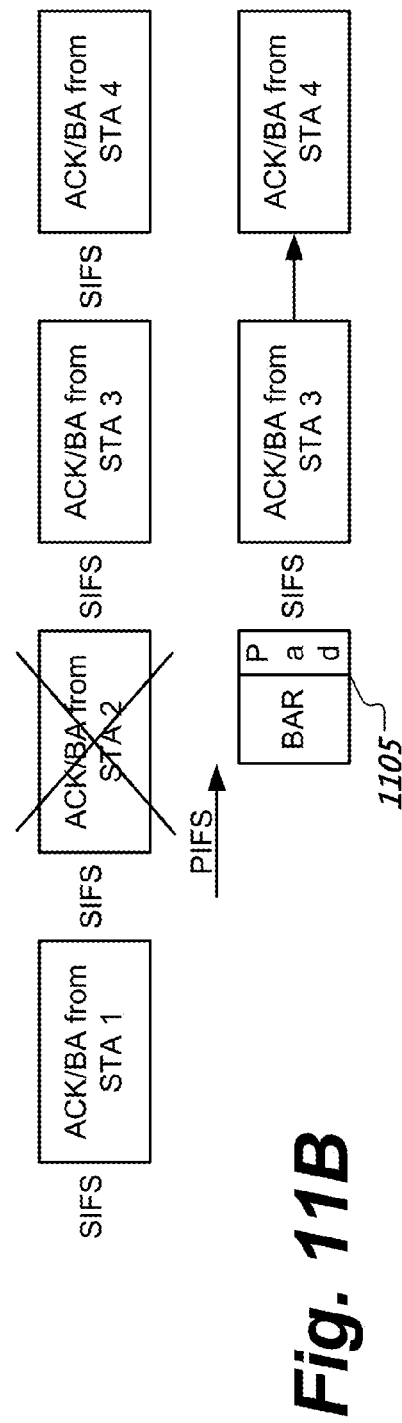
Fig. 11A
Fig. 11B

SDMA MULTI-DEVICE WIRELESS COMMUNICATIONS

CROSS REFERENCE TO RELATED APPLICATIONS

This disclosure is a continuation application of U.S. patent application Ser. No. 12/850,529, filed Aug. 4, 2010 and entitled "SDMA MULTI-DEVICE WIRELESS COMMUNICATIONS" (now U.S. Pat. No. 8,923,217 issued Dec. 30, 2014), which claims the benefit of the priority of U.S. Provisional Application Ser. No. 61/233,428, filed on Aug. 12, 2009 and entitled "SDMA MAC SUPPORTS," U.S. Provisional Application Ser. No. 61/240,933, filed on Sep. 9, 2009, entitled "MULTI-USER RESPONSES," U.S. Provisional Application Ser. No. 61/241,826, filed on Sep. 11, 2009, entitled "SDMA MAC SUPPORT," U.S. Provisional Application Ser. No. 61/242,928, filed on Sep. 16, 2009, entitled "SDMA MAC SUPPORT," U.S. Provisional Application Ser. No. 61/251,411, filed on Oct. 14, 2009, entitled "SDMA MAC SUPPORT," U.S. Provisional Application Ser. No. 61/252,480, filed on Oct. 16, 2009, entitled "MULTI-USER RESPONSE RECOVERY," and U.S. Provisional Application Ser. No. 61/324,254, filed on Apr. 14, 2010, entitled "MULTI-USER RESPONSES." All of the above identified applications are incorporated herein by reference in their entirety.

BACKGROUND

The present disclosure relates to wireless communication systems such as Wireless Local Area Networks (WLANs)

Wireless communication systems can include multiple wireless communication devices that communicate over one or more wireless channels. When operating in an infrastructure mode, a wireless communication device called an access point (AP) provides connectivity with a network such as the Internet to other wireless communication devices, e.g., client stations or access terminals (AT). Various examples of wireless communication devices include mobile phones, smart phones, wireless routers, wireless hubs. In some cases, wireless communication electronics are integrated with data processing equipment such as laptops, personal digital assistants, and computers.

Wireless communication systems such as WLANs can use one or more wireless communication technologies such as orthogonal frequency division multiplexing (OFDM). In an OFDM based wireless communication system, a data stream is split into multiple data substreams. Such data substreams are sent over different OFDM subcarriers, which can be referred to as tones or frequency tones.

Some wireless communication systems use a single-in-single-out (SISO) communication approach, where each wireless communication device uses a single antenna. Other wireless communication systems use a multiple-in-multiple-out (MIMO) communication approach, where a wireless communication device, for example, uses multiple transmit antennas and multiple receive antennas. WLANs such as those defined in the Institute of Electrical and Electronics Engineers (IEEE) wireless communications standards, e.g., IEEE 802.11a, IEEE 802.11n, or IEEE 802.11ac, can use OFDM to transmit and receive signals. Moreover, WLANs, such as ones based on the IEEE 802.11n standard, can use OFDM and MIMO.

Wireless communication devices in a WLAN can use one or more protocols for medium access control (MAC) and physical (PHY) layers. For example, a wireless communication device can use a Carrier Sense Multiple Access (CSMA) with Collision Avoidance (CA) based protocol for a MAC layer and OFDM for the PHY layer. A MIMO-based wireless communication device can transmit and receive multiple spatial streams over multiple antennas in each of the tones of an OFDM signal.

SUMMARY

The present disclosure includes systems and techniques for wireless local area networks. According to an aspect of the described systems and techniques, a method for wireless local area networks includes transmitting, in a frequency band, information to wireless communication devices. Transmitting information can include transmitting spatially steered first signals that concurrently provide data to the wireless communication devices and transmitting one or more second signals to the wireless communication devices to control transmission of responses such as acknowledgements from the wireless communication devices in the frequency band. An acknowledgement can indicate a successful reception of a respective portion of the data. The method can include monitoring for the responses in the frequency band. The method can include selectively transmitting, based on a lack of reception of an expected acknowledgement, a third signal in the frequency band to prevent a transmission from another wireless communication device different than the wireless communication devices. The third signal can include information to reschedule a response from one or more devices.

In some implementations, monitoring for the acknowledgements in the frequency band can include detecting a lack of reception of an acknowledgement from a first device of the wireless communication devices. Selectively transmitting the third signal can include transmitting information to a second device of the wireless communication devices to reschedule a transmission of a response from the second device, where the second device is originally scheduled to send an acknowledgement after the first device. Transmitting the one or more second signals can include transmitting first response scheduling information to cause a first device of the wireless communication devices to transmit an acknowledgement during a first portion of an acknowledgement period and transmitting second response scheduling information to cause a second device of the wireless communication devices to transmit an acknowledgement during a second, subsequent portion of the acknowledgement period.

Implementations can include controlling the wireless communication devices to perform reachability testing and generating an acknowledgement response schedule based on the reachability testing. The reachability testing can include determining whether a signal emanating from the first device is at least received by the second device. In some implementations, the first and second response scheduling information are based on the acknowledgement response schedule.

Transmitting the spatially steered first signals can include transmitting a first packet data unit (PDU) of a medium access control (MAC) layer to a first device of the wireless communication devices via a first spatial wireless channel and transmitting a second PDU of the MAC layer to a second device of the wireless communication devices via a second spatial wireless channel. The first PDU can include first information that causes the first device to selectively transmit an acknowledgement in a first period. The second PDU can include second information that causes the second device to selectively transmit an acknowledgement in a second period that is subsequent to the first period.

Transmitting the spatially steered first signals can include transmitting space division multiple access frames to the wireless communication devices. In some implementations, at least one of the frames can include padding. In some implementations, an amount of the padding is based on a maximum length that is determined by lengths of the frames.

Transmitting the one or more second signals can include transmitting a block acknowledgment request to at least a first device of the wireless communication devices. Transmitting the block acknowledgment request can include transmitting an aggregated block acknowledgment request to the wireless communication devices. The aggregated block acknowledgment request can include a first indication of an acknowledgement response time for the first device and a second indication of a subsequent acknowledgement response time for a second device of the wireless communication devices.

Transmitting the one or more second signals can include transmitting, via a first spatial wireless channel, a signaling field in a physical layer to signal a first acknowledgement response time for a first device of the wireless communication devices; and transmitting, via a second spatial wireless channel, a signaling field in a physical layer to signal a second, subsequent acknowledgement response time for a second device of the wireless communication devices.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiment can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Systems and apparatuses for wireless communication can include circuitry to transmit, in a frequency band, signals to wireless communication devices, where the signals includes spatially steered first signals that concurrently provide data to the wireless communication devices, and one or more second signals to the wireless communication devices to control transmission of acknowledgements from the wireless communication devices in the frequency band; circuitry to monitor for the acknowledgements in the frequency band; and circuitry to selectively transmit, based on a lack of reception of an expected acknowledgement, a third signal in the frequency band to prevent a transmission from another wireless communication device different than the wireless communication devices.

In some implementations, circuitry to monitor is configured to detect a lack of reception of an acknowledgement from a first device of the wireless communication devices. In some implementations, circuitry to selectively transmit the third signal is configured to transmit information to a second device of the wireless communication devices to reschedule a transmission of a response from the second device.

In some implementations, the one or more second signals collectively include first response scheduling information to cause a first device of the wireless communication devices to transmit an acknowledgement during a first portion of an acknowledgement period and second response scheduling information to cause a second device of the wireless communication devices to transmit an acknowledgement during a second, subsequent portion of the acknowledgement period.

Implementations can include circuitry to control the wireless communication devices to perform reachability testing. The reachability testing can include determining whether a signal emanating from the first device is at least received by the second device. Implementations can include circuitry to generate an acknowledgement response schedule based on the reachability testing. In some implementations, the first and second response scheduling information are based on the acknowledgement response schedule.

In some implementations, the one or more second signals is indicative of a block acknowledgment request to at least a first device of the wireless communication devices. In some implementations, the one or more second signals are indicative of an aggregated block acknowledgment request to the wireless communication devices. The aggregated block acknowledgment request can include a first indication of an acknowledgement response time for the first device and a second indication of a subsequent acknowledgement response time for a second device of the wireless communication devices.

In some implementations, the spatially steered first signals collectively includes a first PDU of a MAC layer to a first device of the wireless communication devices via a first spatial wireless channel and a second PDU of the MAC layer to a second device of the wireless communication devices via a second spatial wireless channel. The first PDU can include first information that causes the first device to selectively transmit an acknowledgement in a first period. The second PDU can include second information that causes the second device to selectively transmit an acknowledgement in a second period that is subsequent to the first period.

Implementations can include circuitry to transmit, via a first spatial wireless channel, a signaling field in a physical layer to signal a first acknowledgement response time for a first device of the wireless communication devices. Implementations can include circuitry to transmit, via a second spatial wireless channel, a signaling field in a physical layer to signal a second, subsequent acknowledgement response time for a second device of the wireless communication devices. Implementations can include circuitry to transmit space division multiple access frames to the wireless communication devices. One or more frames can include padding. An amount of the padding can be based on a maximum length that is determined by lengths of the frames.

In another aspect, systems and apparatuses can include circuitry to communicate with two or more wireless communication devices and processor electronics. The processor electronics can be configured to control the transmission of signals, in a frequency band, to the wireless communication devices. The signals can include spatially steered first signals that concurrently provide data to the wireless communication devices. The signals can include one or more second signals to the wireless communication devices to control transmission of responses from the wireless communication devices in the frequency band. The processor electronics can be configured to monitor for the responses in the frequency band. The processor electronics can be configured to control, based on a lack of reception of an expected response, a transmission of a third signal in the frequency band to prevent a transmission from another wireless communication device different than the wireless communication devices.

In some implementations, the processor electronics are configured to detect a lack of reception of an acknowledgement from a first device of the wireless communication devices. The third signal can include information to reschedule a transmission of a response from a second device of the wireless communication devices.

Details of one or more implementations are set forth in the accompanying drawings and the description below. Other features and advantages may be apparent from the description and drawings, and from the claims.

DRAWING DESCRIPTIONS

Figure 4:
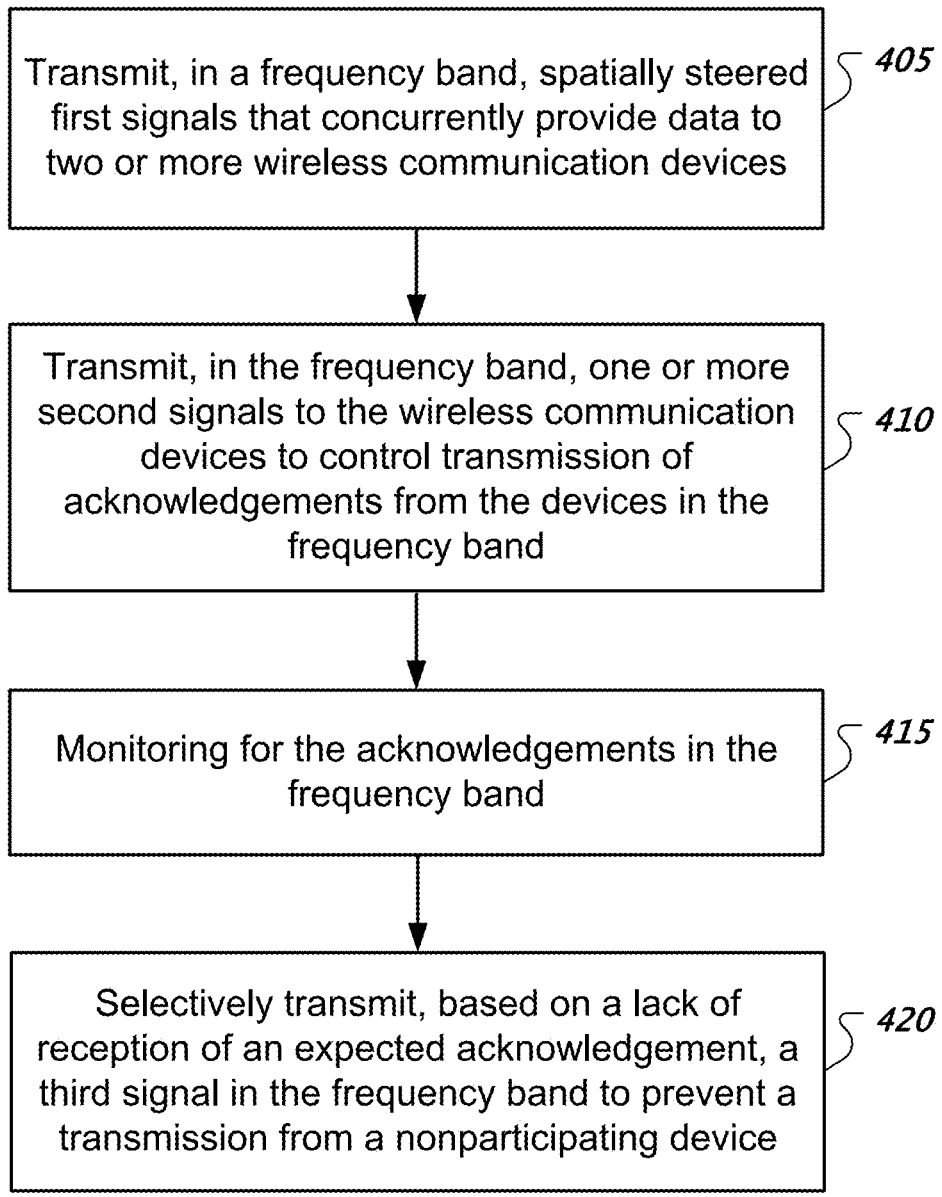
Figure 5:
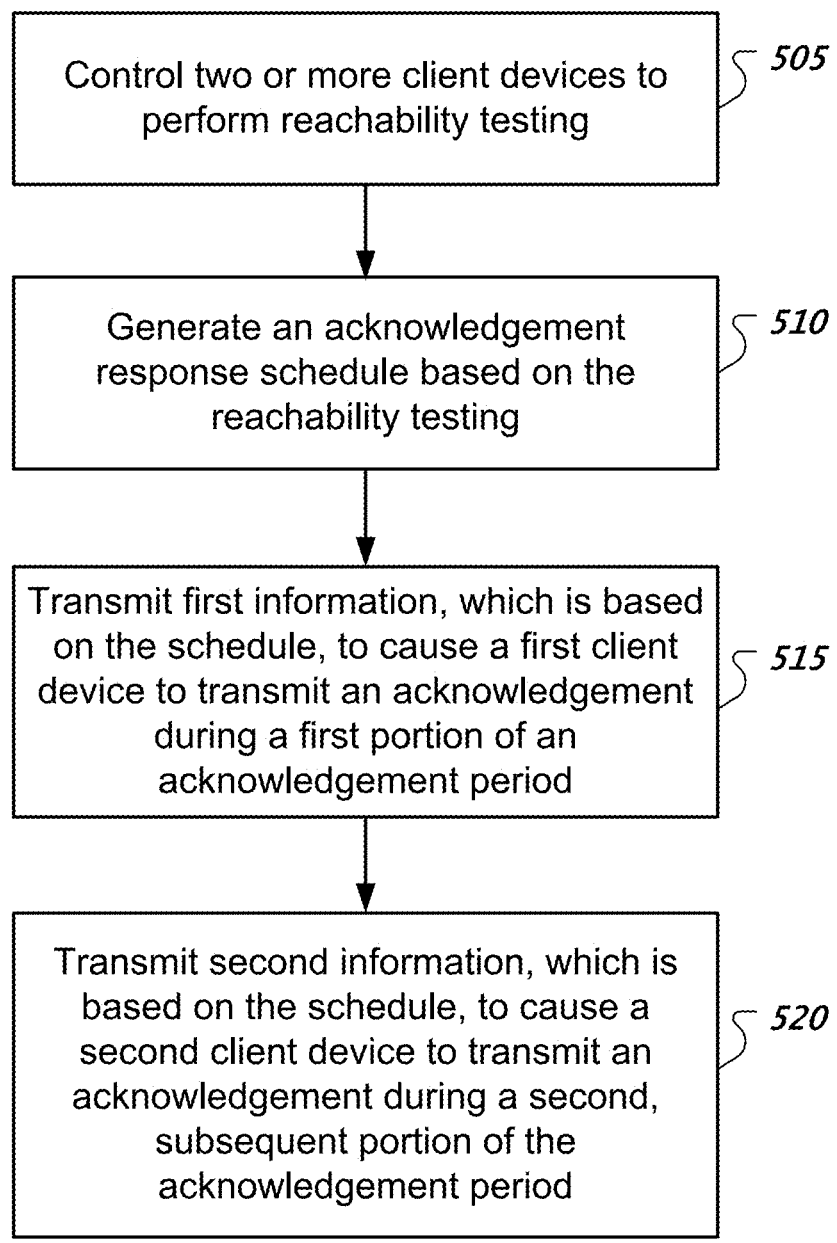
Figure 6:
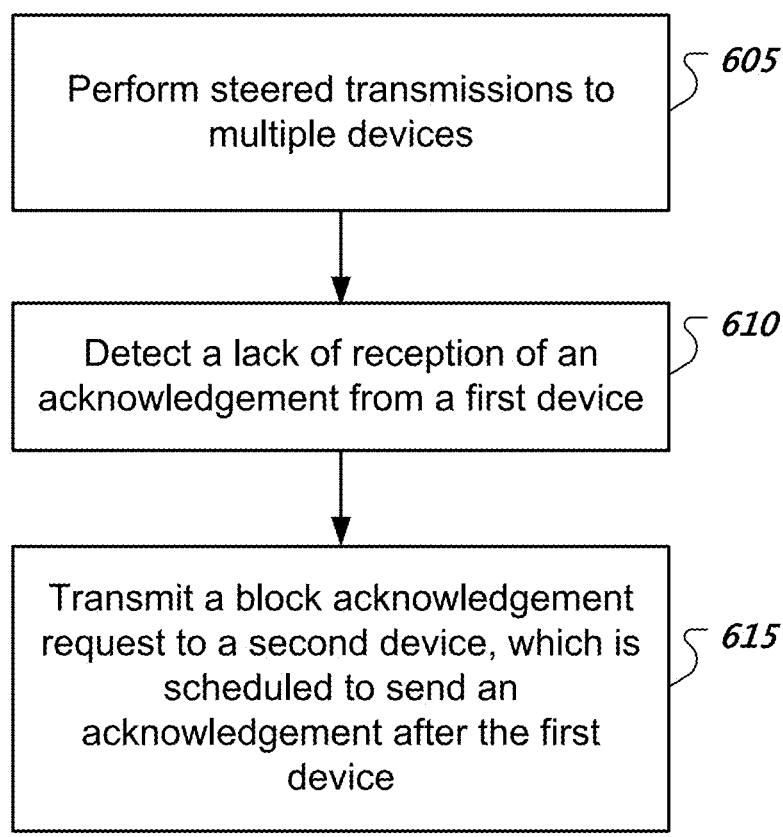

FIGS. 4, 5, and 6 show different examples of communication processes.

FIGS. 7A, 7B, 7C, 7D, 7E, and 7F show examples of communication flow layouts that include one or more block acknowledgement requests that are based on space division multiple access communications.

FIGS. 8A, 8B, 8C, 8D, 8E, 8F, 8G, 8H, 8I, 8J, and 8K show examples of communication flow layouts that include MAC scheduled acknowledgement information that is based on space division multiple access communications.

FIGS. 9A, 9B, 9C, 9D, and 9E show examples of communication flow layouts that include physical layer scheduled acknowledgement information that is based on space division multiple access communications.

Figure 10:
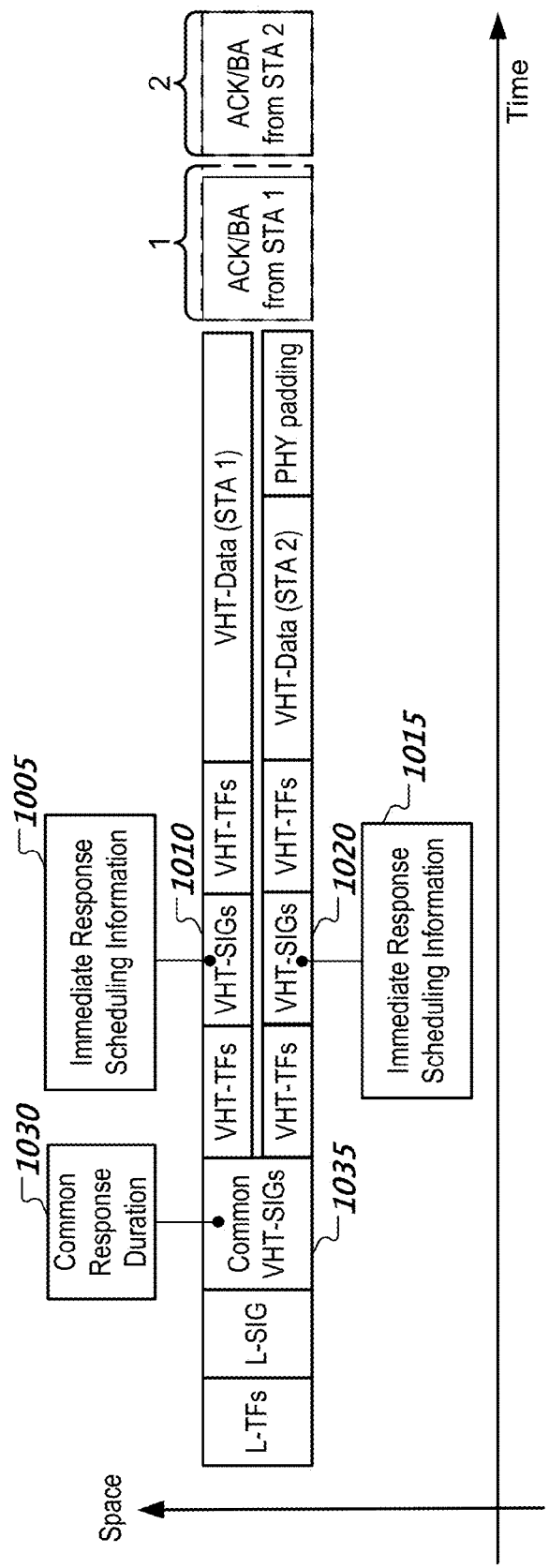

FIG. 10 shows an example of a communication flow layout that includes immediate response scheduling information.

FIGS. 11A, 11B, 11C, 11D, 11E, 11F, 11G, and 11H show examples of transmission sequences based on multi-user response recovery.

Figure 12A:
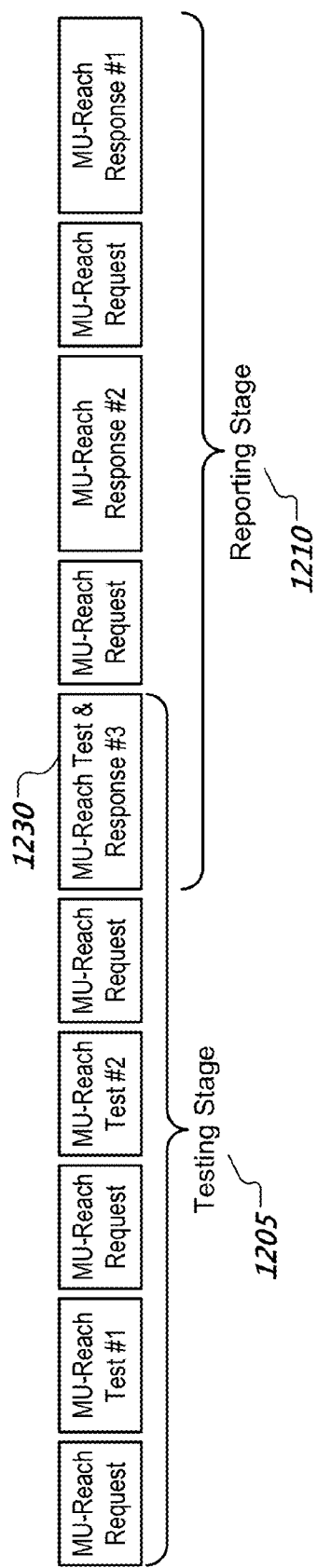

FIG. 12A shows an example of a communication flow layout associated with a multi-user reachability check process.

Figure 12B:
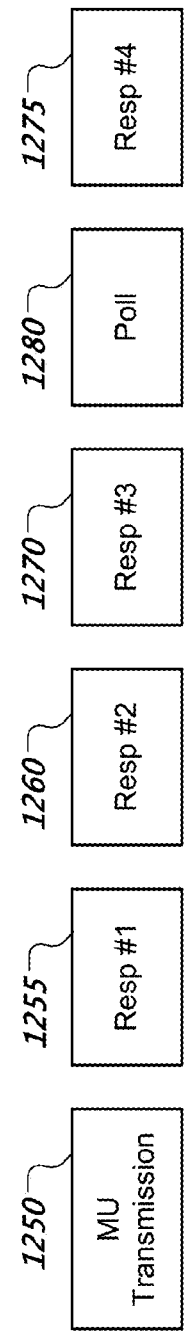

FIG. 12B shows an example of a communication flow layout based on a multi-user reachability information.

Figure 13A:
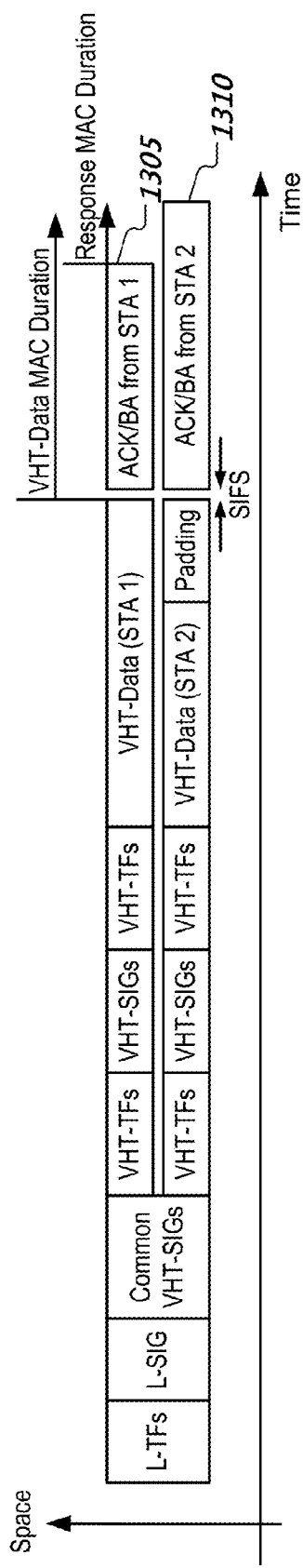
Figure 13B:
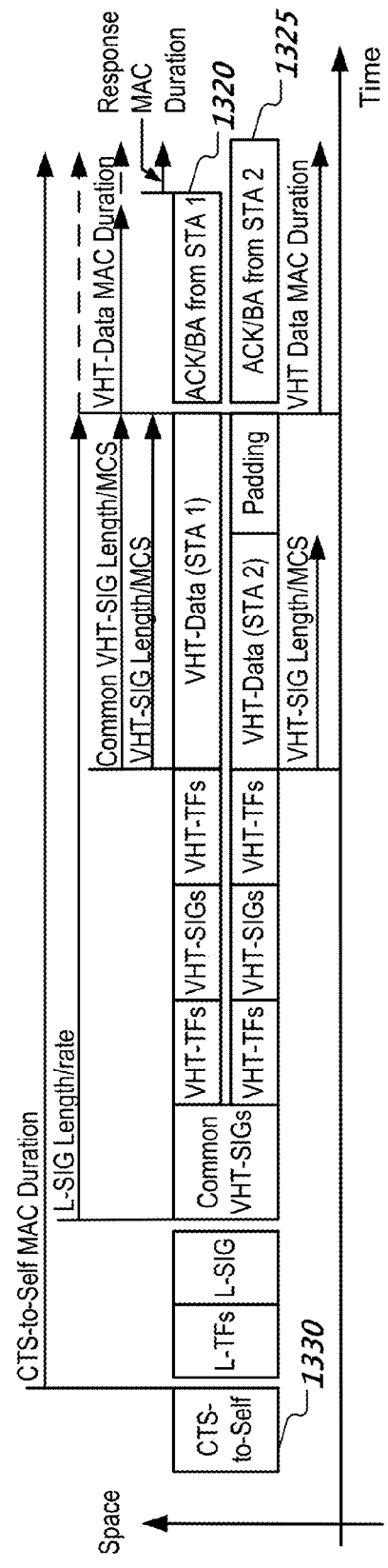

FIGS. 13A and 13B show different examples of a communication flow layout that includes downlink and uplink space division multiple access communications.

Like reference symbols in the various drawings indicate like elements.

DETAILED DESCRIPTION

This disclosure provides details and examples of technologies for wireless local area networks, including systems and techniques for space division multiple access (SDMA) communications and multi-device acknowledgement response mechanisms. Examples of such response mechanisms include a polling based multi-device response mechanism, a scheduled based multi-device response mechanism, and a sequential multi-device response mechanism. The techniques and architectures presented herein can be implemented in a variety of wireless communication systems such as ones based on IEEE 802.11n or IEEE 802.11ac.

Figure 1A:
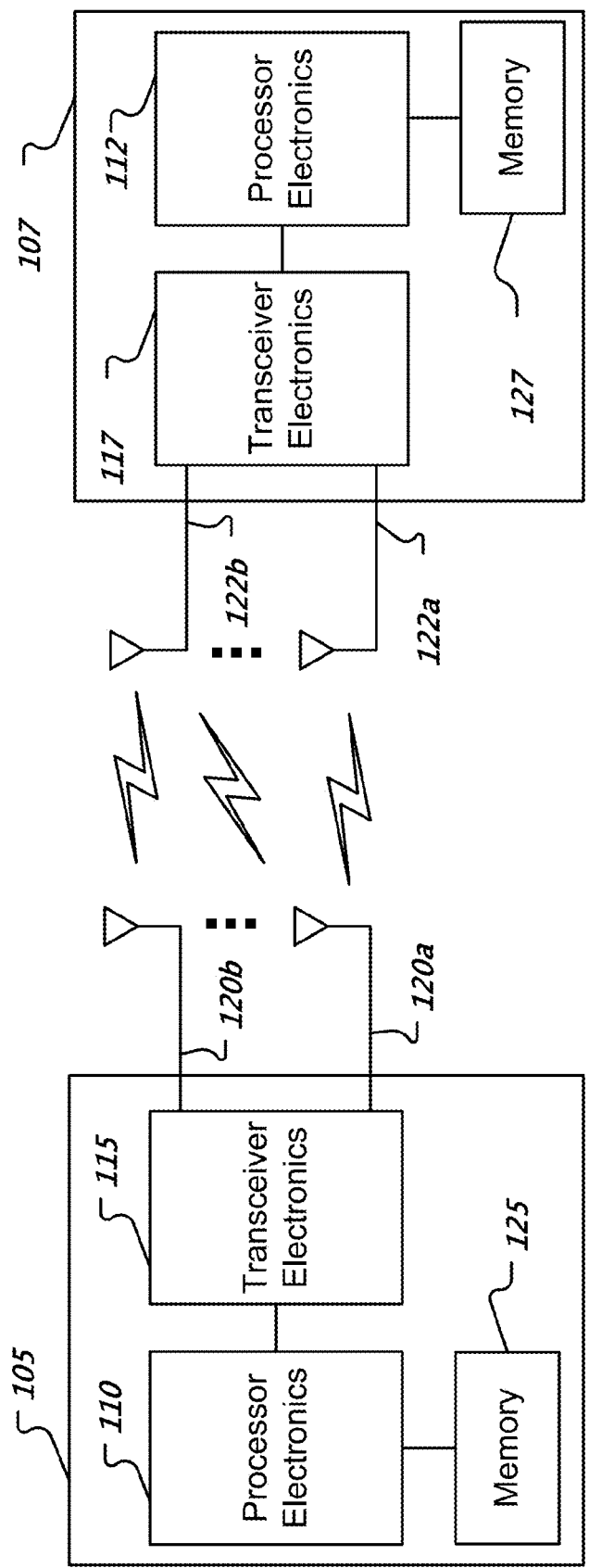
FIG. 1A shows an example of a wireless local area network with two wireless communication devices.

FIG. 1A shows an example of a wireless local area network with two wireless communication devices. Wireless communication devices 105, 107 such as an access point (AP), base station (BS), access terminal (AT), client station, or mobile station (MS) can include circuitry such as processor electronics 110, 112. Processor electronics 110, 112 can include one or more processors that implement methods effecting the techniques presented in this disclosure. Wireless communication devices 105, 107 include circuitry such as transceiver electronics 115, 117 to send and receive wireless signals over one or more antennas 120a, 120b, 122a, 122b. In some implementations, transceiver electronics 115, 117 include multiple radio units. In some implementations, a radio unit includes a baseband unit (BBU) and a radio frequency unit (RFU) to transmit and receive signals. Wireless communication devices 105, 107 include one or more memories 125, 127 configured to store information such as data, instructions, or both. In some implementations, wireless communication devices 105, 107 include dedicated circuitry for transmitting and dedicated circuitry for receiving. In some implementations, a wireless communication device 105, 107 is operable to act as a serving device (e.g., an access point), or a client device.

A first wireless communication device 105 can transmit data to two or more devices via two or more spatial wireless communication channels such as orthogonal spatial subspaces, e.g., orthogonal Space Division Multiple Access (SDMA) subspaces. For example, the first wireless communication device 105 can concurrently transmit data to a second wireless communication device 107 using a spatial wireless channel and can transmit data to a third wireless communication device (not shown) using a different spatial wireless channel. In some implementations, the first wireless communication device 105 implements a space division technique to transmit data to two or more wireless communication devices using two or more spatial multiplexing matrices to provide spatial separated wireless channels in a single frequency range.

Wireless communication devices such as a MIMO enabled access point can transmit signals for multiple client wireless communication devices at the same time in the same frequency range by applying one or more transmitter side beam forming matrices to spatially separate signals associated with different client wireless communication devices. Based on different signal patterns at the different antennas of the wireless communication devices, each client wireless communication device can discern its own signal. A MIMO enabled access point can participate in sounding to obtain channel state information for each of the client wireless communication devices. The access point can compute spatial multiplexing matrices such as spatial steering matrices based on the different channel state information to spatially separate signals to different client devices.

A wireless communication device can use a transmission signal model to generate SDMA transmission signals for two or more devices. Generating SDMA transmission signals can include using spatial multiplexing matrixes associated with respective client devices. In some implementations, a wireless communication device can construct a multiplexing matrix W for client devices based on interference avoidance, signal-to-interference and noise ratio (SINR) balancing, or a combination of these. Interference avoidance attempts to minimize the amount of non-desired signal energy arriving at a client device. Interference avoidance can ensure that signals intended for a particular client arrive only at that particular client device and cancel out at a different client device. A wireless communication device can perform SINR balancing. SINR balancing can include determining multiplexing matrices to actively control the SINRs observed at different client devices. For example, one SINR balancing approach can include maximizing the minimum SINR across serviced client devices.

A serving device, such as a device operated as an access point, can simultaneously communicate with multiple client devices via different spatial wireless channels. The serving device can use multiplexing matrices, such as steering matrices, to transmit information on different spatial wireless channels. The serving device can multiply a transmission vector for the i-th client device by a respective multiplexing matrix. The multiplexing matrix for each client device can differ. A multiplexing matrix can be a function of the wireless channel between the serving device and a client device. The serving device can combine steered signal vectors corresponding to the different client devices to produce transmission signals that simultaneously transmit different information to respective client devices.

In some implementations, a serving device uses an OFDM transmission signal model based on $$S = \sum_{i=1}^{N} W_i x_i$$

where s is a transmitted signal vector for one tone, N is a number of simultaneously serviced clients, $x_i$ is an information vector ($T_i \times 1$, $T < P_i$) intended for the i-th client, $W_i$ is a multiplexing matrix ($M \times T_i$) for the i-th client, M is a number of transmit antennas of the serving device, and $P_i$ is the number of receive antennas of the i-th client.

In some implementations, a wireless communication device can determine multiple wireless channel matrices $H_k^i$ based on one or more received signals. Here, $H_k^i$ represents the channel conditions for the k-th tone associated with the i-th client. A serving device can transmit on multiple tones to two or more clients. For example, the first tone received by the first client can be expressed as $H_1^1[W_1^1 x_1 + W_1^2 x_2 + \ldots + W_1^N x_S]$, where $W_k^i$ is the multiplexing matrix for the i-th client at the k-th tone.

A multiplexing matrix W can be selected to cause the first client to receive $H_1^1 W_1^1 x_1$ and to have the remaining signals $x_2, x_3, \ldots, x_S$ be in a null space for the first client. Therefore, when using a signal interference approach, the values of the multiplexing matrix W are selected such that $H_1^1 W_1^2 \approx 0, \ldots, H_1 W_1^N \approx 0$. In other words, the multiplexing matrix W can adjust phases and amplitudes for these OFDM tones such that a null is created at the first client. That way, the first client can receive the intended signal $x_1$ without interference from other signals $x_2, x_3, \ldots, x_S$ intended for the other clients.

In general, a received signal can include a signal component intended for i-th client and one or more co-channel interference components from one or more signals intended for one or more other clients. For example, a received signal at the i-th client is expressed by:

$$y_i = H_i W_i x_i + H_i \sum_{j \neq i} W_j x_j + n_i$$

where $H_i$ represents a wireless channel matrix associated with a wireless channel between a serving device and the i-th client, and $n_i$ represents noise at the i-th client. The summation is over values of j corresponding to clients other than the i-th client.

When servicing multiple clients simultaneously, power available at a serving device can be allocated across multiple clients. This, in turn, affects the SINR observed at each of the clients. The serving device can perform flexible power management across the clients. For example, a client with low data rate requirements can be allocated less power by the serving device. In some implementations, transmit power is allocated to clients that have high probability of reliable reception (so as not to waste transmit power). Power can be adjusted in the corresponding multiplexing matrix W, using other amplitude adjustment methods, or both, such as adjusting power with the matrix W after using other methods.

A serving device can determine a multiplexing matrix W associated with a client based on channel conditions between the serving device and the client. The serving device and the client can perform sounding to determine wireless channel characteristics. Various examples of sounding techniques include explicit sounding and implicit sounding.

Figure 1B:
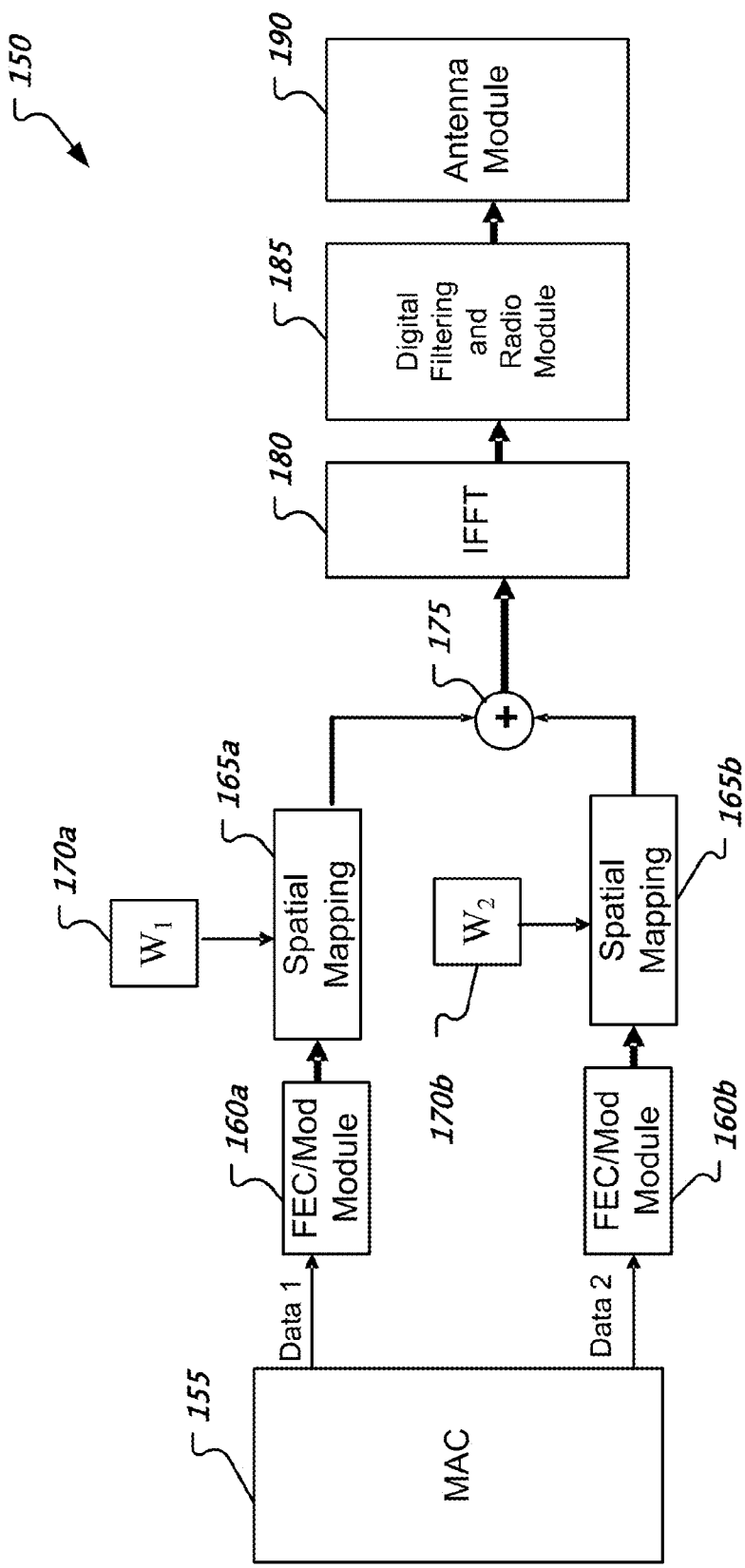
FIG. 1B shows an example of a wireless communication device architecture.

FIG. 1B shows an example of a wireless communication device architecture. A wireless communication device 150 can produce signals for different clients that are spatially separated by respective multiplexing matrices $W_i$, e.g., steering matrices. Each $W_i$ is associated with a subspace. A wireless communication device 150 includes a MAC module 155. The MAC module 155 can include one or more MAC control units (MCUs) (not shown). The wireless communication device 150 includes two or more modules 160a, 160b that receive data streams from the MAC module 155 which are associated with different clients. The two or more modules 160a, 160b can perform encoding such as a forward error correction (FEC) encoding technique and modulation on a data stream. The two or more modules 160a, 160b respectively are coupled with two or more spatial mapping modules 165a, 165b.

The spatial mapping modules 165a, 165b can access a memory 170a, 170b to retrieve a spatial multiplexing matrix associated with a data stream's intended client. In some implementations, the spatial mapping modules 165a, 165b access the same memory, but at different offsets to retrieve different matrices. An adder 175 can sum outputs from the spatial mapping modules 165a, 165b.

An Inverse Fast Fourier Transform (IFFT) module 180 can perform an IFFT on an output of the adder 175 to produce a time domain signal. A digital filtering and radio module 185 can filter the time domain signal and amplify the signal for transmission via an antenna module 190. An antenna module 190 can include multiple transmit antennas and multiple receive antennas. In some implementations, an antenna module 190 is a detachable unit that is external to a wireless communication device 150.

In some implementations, a wireless communication device 150 includes one or more integrated circuits (ICs). In some implementations, a MAC module 155 includes one or more ICs. In some implementations, a wireless communication device 150 includes an IC that implements the functionality of multiple units and/or modules such as a MAC module, MCU, BBU, or RFU. In some implementations, a wireless communication device 150 includes a host processor that provides a data stream to a MAC module 155 for transmission. In some implementations, a wireless communication device 150 includes a host processor that receives a data stream from the MAC module 155. In some implementations, a host processor includes a MAC module 155.

A MAC module 155 can generate a MAC Service Data Unit (MSDU) based on data received from higher level protocols such a Transmission Control Protocol over Internet Protocol (TCP/IP). A MAC module 155 can generate a MAC Protocol Data Unit (MPDU) based on a MSDU. In some implementations, a MAC module 155 can generate a Physical Layer Service Data Unit (PSDU) based on a MPDU. For example, a wireless communication device can generate a data unit, e.g., a MPDU or a PSDU, that is intended for a single wireless communication device recipient.

In some implementations, a wireless communication device 150 can perform omni-directional transmissions that are intended for multiple client devices. For example, the MAC module 155 operates a single data pathway between the MAC module 155 and the IFFT module 180. In some implementations, a wireless communication device 150 can perform steered transmissions that concurrently separate data to multiple client devices. The device 150 can alternate between omni-directional transmissions and steered transmissions. In steered transmissions, the device 150 can transmit a first Physical Layer Protocol Data Unit (PPDU) to a first client via a first spatial wireless channel and concurrently transmit a second PPDU to a second client via a second spatial wireless channel.

Figure 2:
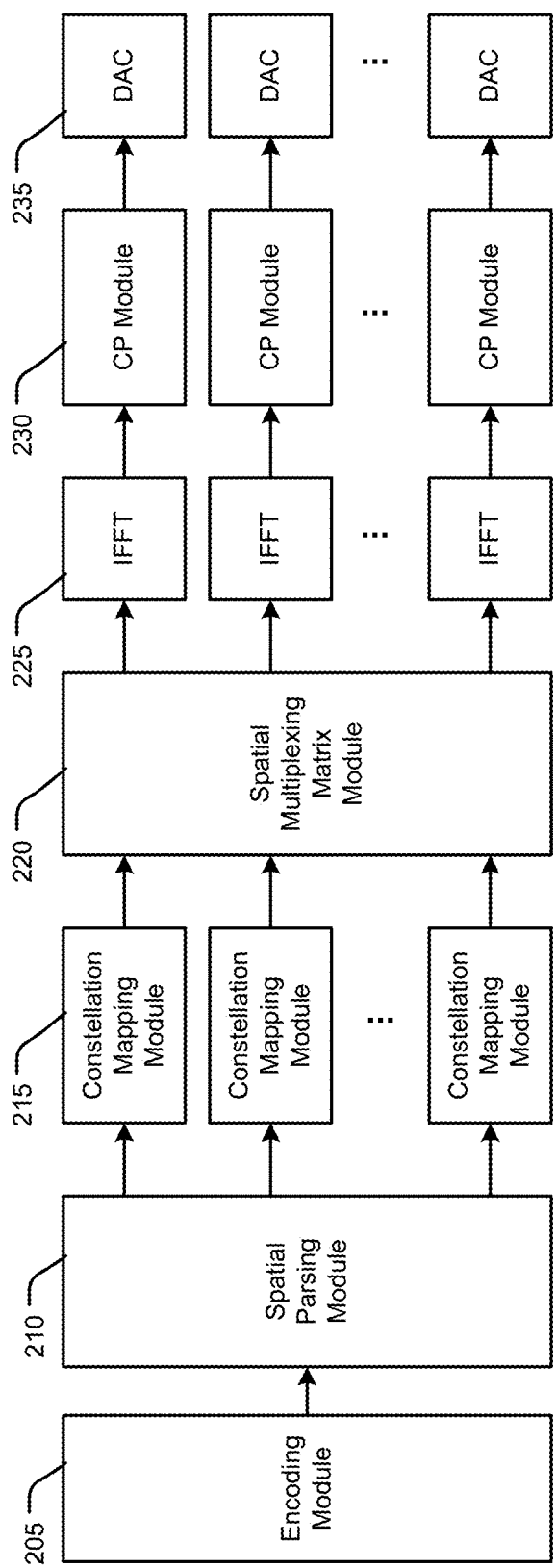
FIG. 2 shows an example of a functional block diagram of a transmit path of wireless communication device.

FIG. 2 shows an example of a functional block diagram of a transmit path of wireless communication device. In this example, a transmit path is configured for MIMO communications. A wireless communication device such as an AP can include one or more transmit paths. An AP's transmit path can include an encoding module 205 configured to receive a data stream, such as an audio data stream, a video data stream, or combination thereof. The encoding module 205 outputs encoded bit streams to a spatial parsing module 210, which performs spatial mapping to produce multiple outputs.

Outputs of the spatial parsing module 210 are input into constellation mapping modules 215, respectively. In some implementations, a constellation mapping module 215 includes a serial-to-parallel converter that converts an incoming serial stream to multiple parallel streams. The constellation mapping module 215 can perform quadrature amplitude modulation (QAM) on multiple streams produced by a serial-to-parallel conversion. The constellation mapping module 215 can output OFDM tones that are input to a spatial multiplexing matrix module 220. The spatial multiplexing matrix module 220 can multiply the OFDM tones by a spatial multiplexing matrix to produce signal data for multiple transmit antennas.

Outputs of the spatial multiplexing matrix module 220 are input to Inverse Fast Fourier Transform (IFFT) modules 225. In some implementations, an IFFT module 225 can include a multiple access module to map different streams to different subcarrier groups. Outputs of the IFFT modules 225 are input to cyclic prefix (CP) modules 230. Outputs of the CP modules 230 are input to digital-to-analog converters (DACs) 235, which produce analog signals for transmission on multiple transmit antennas, respectively.

Figure 3:
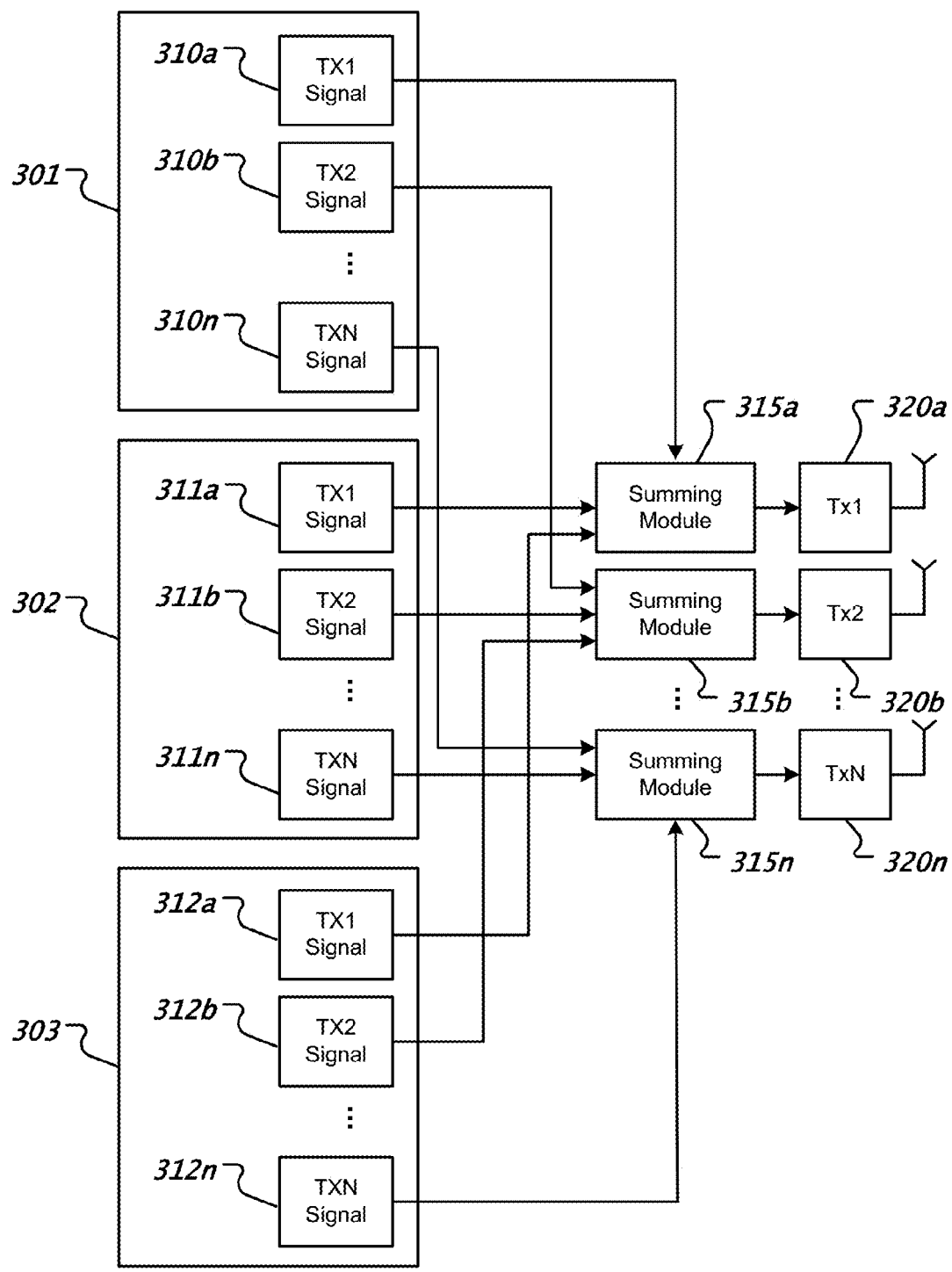
FIG. 3 shows an example of an architecture that combines multiple transmission signals for transmission on multiple antennas.

FIG. 3 shows an example of an architecture that combines multiple transmission signals for transmission on multiple antennas. A wireless communication device can include two or more transmit paths 301, 302, 303 that are each configured for MIMO communications. A first transmit path 301 generates multiple transmit signals 310$a$, 310$b$, 310$n$ for transmission on multiple transmit antennas 320$a$, 320$b$, 320$n$, respectively. A second transmit path 302 generates multiple transmit signals 311$a$, 311$b$, 311$n$ for transmission on multiple transmit antennas 320$a$, 320$b$, 320$n$, respectively. A third transmit path 303 generates multiple transmit signals 312$a$, 312$b$, 312$n$, for transmission on multiple transmit antennas 320$a$, 320$b$, 320$n$, respectively.

The wireless communication device can include multiple summing modules 315$a$, 315$b$, 315$n$ that are associated with multiple transmit antennas 320$a$, 320$b$, 320$n$, respectively. In some implementations, summing modules 315$a$, 315$b$, 315$n$ sum corresponding outputs of DACs in each of the transmit paths 301, 302, 303 to produce combined transmit signals for each of antennas 320$a$, 320$b$, 320$n$.

An access point can concurrently send individualized information to multiple clients. In response, the clients can send an acknowledgement response to the access point that indicates a successful reception of the information. Moreover, the access point can send acknowledgement response information to the client to control the client's acknowledgement response, e.g., a scheduled time period in which a client can transmit an acknowledgement. The access point can transmit information to reschedule, extend, or protect a transmission period for acknowledgement responses in the event that a client does not send an acknowledgement response.

FIG. 4 shows an example of a communication process. At 405, a communication process includes transmitting, in a frequency band, spatially steered first signals that concurrently provide data to two or more wireless communication devices. For example, a serving device such as an access point can perform a transmission of two or more steered communications to two or more client devices via a wireless medium. The wireless medium can be shared by other devices, such as a nonparticipating device, e.g., a device that is not in communication with the serving device.

In some implementations, transmitting spatially steered signals can include transmitting a first packet data unit to a first client via a first spatial wireless channel and a second packet data unit to a second client via a second spatial wireless channel. In some implementations, the first packet data unit includes a first response scheduling information such as a first MAC duration value that causes the first device to selectively transmit an acknowledgement in a first period, whereas the second packet data unit includes second response scheduling information such as a second, longer MAC duration value that causes the second device to selectively transmit an acknowledgement in a second period that is subsequent to the first period. These and other techniques described herein can be extended to three or more clients.

In some implementations, transmitting the spatially steered first signals can include transmitting SDMA frames to multiple wireless communication devices, respectively. In some cases, at least one of the SDMA frames includes padding, such as MAC padding or PHY padding. An amount of the padding can be based on a maximum length that is determined by the lengths of the SDMA frames.

At 410, the process includes transmitting, in the frequency band, one or more second signals to the wireless communication devices to control transmission of acknowledgements from the devices in the frequency band. Transmitting one or more second signals can include transmitting response scheduling information. In some implementations, transmitting one or more second signals includes sending information to trigger a transmission of a response. For example, an access point can send a message to poll a client for a response. In some implementations, the first and second signals refer to first and second portions of a signal. In some implementations, the first and second signals are transmitted in a frame by an access point before a client transmits a response. In some implementations, one or more of the second signals are interleaved with client responses. In some implementations, transmitting spatially steered first signals can include transmitting the one or more second signals. For example, an access point can transmit spatially steered response scheduling information as the second signals to the devices, respectively. In some implementations, a response can include an acknowledgment of a received frame, a feedback to a request (if it exists) in a received frames, or both.

At 415, the process includes monitoring for the acknowledgements in the frequency band. The acknowledgements can indicate a successful reception of a respective portion of steered communication data. If a client fails to successfully receive data from a serving device, the client is not required to send a response. If a client successfully receives data from the serving device, the client can send an acknowledgement. In some implementations, an acknowledgement can include a block acknowledgement (BA).

At 420, the process includes selectively transmitting, based on a lack of reception of an expected acknowledgement, a third signal in the frequency band to prevent a transmission from a nonparticipating device. The third signal can include information to reschedule a response. For example, a serving device can transmit the third signal based on a detection of a missed acknowledgement from at least one of the client devices. In some implementations, the third signal includes information to establish or extend a transmission period.

In some implementations, a communication process includes transmitting, via a first spatial wireless channel, a signaling field in a physical layer to signal a first acknowledgement response time for a first device. The process can include transmitting, via a second spatial wireless channel, a signaling field in a physical layer to signal a second, subsequent acknowledgement response time for a second device.

FIG. 5 shows another example of a communication process. A communication process can initiate reachability testing to collect reachability information to manage devices that are in communication with a serving device. At 505, the communication process includes controlling two or more client devices to perform reachability testing. Reachability testing, for example, can include determining whether a signal emanating from a device is received by the other ones of the two or more client devices. Such determining can be repeated for multiple devices in a group of SDMA based clients.

At 510, the process includes generating an acknowledgement response schedule based on the reachability testing. An acknowledgement response schedule can specify a response sequence. At 515, the process includes transmitting first information, which is based on the schedule, to cause a first client device to transmit an acknowledgement during a first portion of an acknowledgement period. The first client device can use the first information to determine when to transmit a response. At 520, the process includes transmitting second information, which is based on the schedule, to cause a second client device to transmit an acknowledgement during a second, subsequent portion of the acknowledgement period. The second client device can use the second information to determine when to transmit a response. In some implementations, the second information, upon arrival, can trigger the second client device to send a response.

In some implementations, after an access point transmits response sequence information in SDMA frames, the clients can send responses sequentially based on the received response sequence and, if required, counting of one or more responses from other clients. If a client cannot hear other client transmissions, the access point can send a request to the client to trigger a response.

FIG. 6 shows another example of a communication process. A communication process can selectively re-affirm, or in some cases extend, a transmission period to prevent nonparticipating devices from interrupting a sequence of acknowledgements. At 605, the communication process includes performing steered transmissions to multiple devices. Performing steered transmissions to multiple devices can include producing multiple transmission signals that concurrently transmit different data packets to respective clients. At 610, the process includes detecting a lack of reception of an acknowledgement from a first device. For example, an access point can set a timer to expire based on a time range of when an expected acknowledgement should be received. Based on an expiration of the timer, the access point can detect a lack of reception of an acknowledgement. At 615, the process includes transmitting a block acknowledgement request to a second device, which is scheduled to send an acknowledgement after the first device. The block acknowledgement request can be padded based on an existing schedule of acknowledgements.

With respect to the following figures, transmission signals can include one or more legacy training fields (L-TFs) such as a Legacy Short Training Field (L-STF) or Legacy Long Training Field (L-LTF). Transmission signals can include one or more Legacy Signal Fields (L-SIGs). Transmission signals can include one or more Very High Throughput (VHT) fields such as a VHT Signal Field (VHT-SIG), a VHT Short Training Field (VHT-STF), or a VHT Long Training Field (VHT-LTF). Transmission signals can include VHT-Data fields.

FIGS. 7A, 7B, 7C, 7D, 7E, and 7F show examples of communication flow layouts that include one or more block acknowledgement requests that are based on space division multiple access communications. An access point can transmit information to multiple SDMA clients including application data and one or more block acknowledgement requests (BARs). Based on successfully receiving a signal, a client can send a block acknowledgement (BA or Block ACK). In some implementations, an access point can initiate a Block ACK with multiple Block ACK capable SDMA clients by using an Add Block Acknowledgement (ADDBA) request and response exchange. In some implementations, an access point can use an implicit ACK policy to cause a client to immediately transmit an acknowledgement response after receiving a VHT-Data segment. In some implementations, immediately transmitting an acknowledgement response after receiving a VHT-Data segment can include waiting a predetermined amount of time such as a guard time period before transmitting the acknowledgement. In some implementations, a VHT-Data segment includes or is append with padding.

As shown in FIG. 7A, an access point transmits signals to SDMA clients using omni-directional transmission periods and a steered transmission period. In the steered transmission period, the access point uses two different acknowledgement policies. The access point uses an implicit ACK policy 701 for a first client, e.g., STA 1, and a block ACK policy 702 for a second client, e.g., STA 2. In an implicit ACK policy 701, a client can transmit an acknowledgement response 703 after the end of a received frame, which can include PHY padding. If a SDMA client is not capable of performing a block ACK or fails to initiate a block ACK with the access point, such a SDMA client can be controlled to use an implicit ACK policy and send a response immediately following the received frame.

The access point can have an active Block ACK agreement with multiple SDMA clients. An access point can send a BAR 704 based on receiving an acknowledgement response 703 from a first client. Based on receiving the BAR 704, the second client can send a block acknowledgement 705. As depicted by FIG. 7A, a Short Interframe Space (SIFS) separates message traffic. In some implementations, a SIFS has a duration of 16 microseconds.

As shown in FIG. 7B, an access point transmits a CTS-to-Self 706 to SDMA clients. In the CTS-to-Self 706, a CTS-to-Self MAC duration can indicate the end of multiple immediate acknowledgement responses to SDMA based communications. A client can determine a time to send an "immediate acknowledgement response" based on information received from the access point. Different clients can determine different times to send a respective "immediate acknowledgement response." In some implementations, a guard time period separates access point transmission from client transmission. Determining a time to send an immediate acknowledgement response can include using information such as a guard time period value, L-SIG length, common VHT-SIG length, and VHT-Data MAC duration. A L-SIG length can indicate the end of a maximum length PPDU. In some implementations, a L-SIG rate can indicate the end of a maximum length PPDU. A length of a PPDU can account for an inclusion of PHY padding 708. In some implementations, a L-SIG length or rate can indicate the end of immediate acknowledgement responses (e.g., the end of the last response). A common VHT-SIG length or MCS can indicate the end of a maximum length PPDU. A VHT-SIG length or MCS can indicate the end of a PSDU without PHY padding. A VHT-Data MAC duration can indicate the end of a corresponding immediate response. In some implementations, a VHT-Data MAC duration can indicate the end of multiple immediate acknowledgement responses.

A response MAC duration can indicate the end of a corresponding immediate response. In some implementations, a response MAC duration can indicate the end of multiple immediate acknowledgement responses.

A BAR MAC duration can indicate the end of a corresponding immediate response. In some implementations, a VHT-Data MAC duration can indicate the end of multiple immediate acknowledgement responses.

Figure 7C:
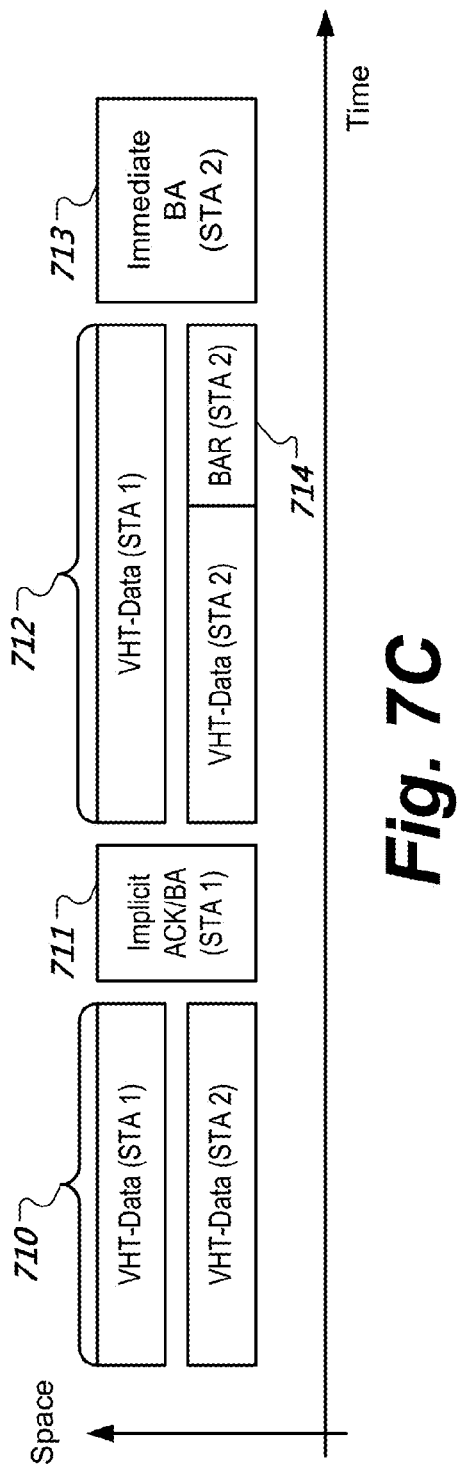

As shown in FIG. 7C, an access point can interleave VHT-Data transmissions 710, 712 with acknowledgement responses 711, 713. Moreover, an access point can attach a BAR 714 to a VHT-Data transmission.

Figure 7D:
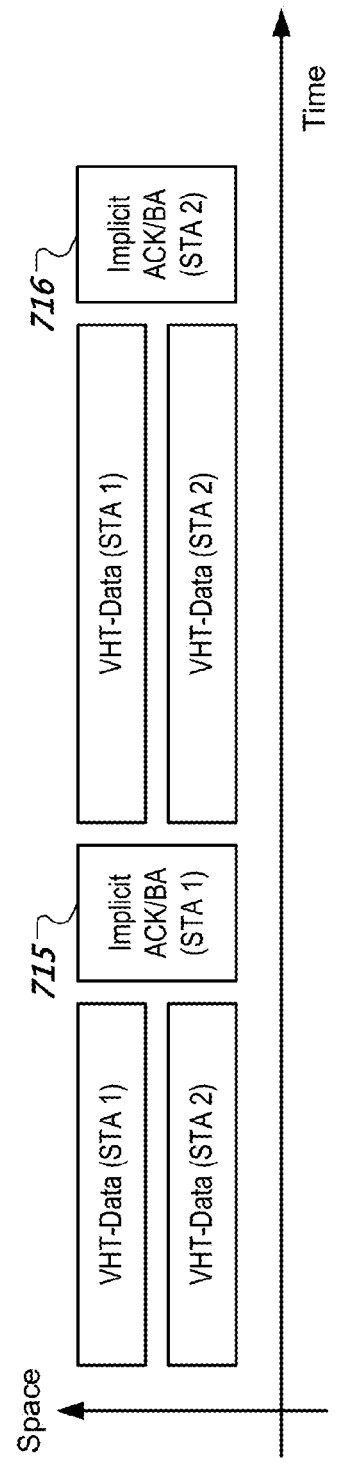

As shown in FIG. 7D, an access point can defer one or more acknowledgement responses to subsequent SDMA transmissions. In this example, an access point rotates through clients to schedule acknowledgement responses. The access point causes a first client to transmit an acknowledgement response 715 after transmitting a group of SDMA signals to first and second clients. The access point causes a second client to transmit an acknowledgement response 716 after transmitting a second group of SDMA signals to the first and second clients.

Figure 7E:
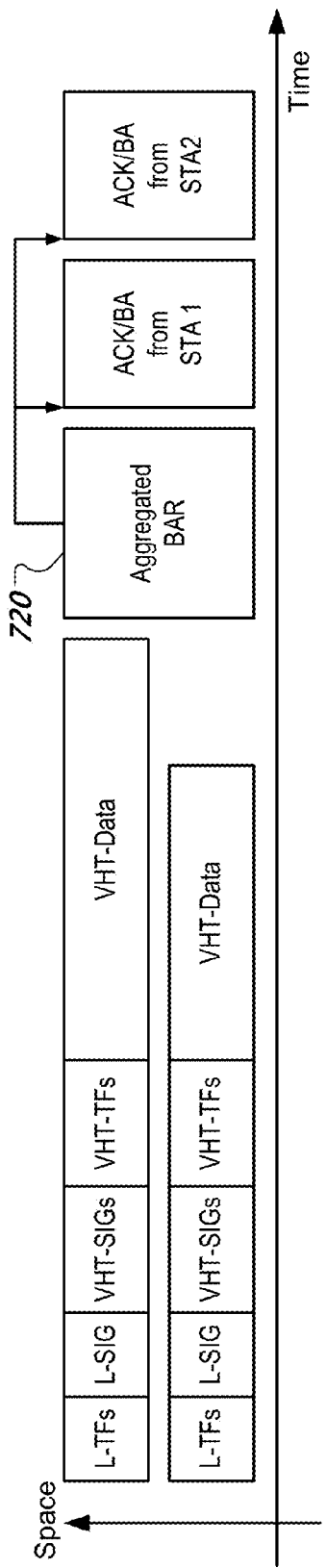

As shown in FIG. 7E, an access point's transmissions include steered transmissions from the beginning of the PPDUs to respective SDMA clients. After the end of the steered transmissions, the access point performs an omni-directional transmission of an aggregated BAR 720. An aggregated BAR 720 can be used in lieu of multiple BARs for respective multiple SDMA clients. An aggregated BAR 720 can include two or more acknowledgement response starting time values for two or more clients, respectively. In some implementations, an aggregated BAR 720 can include addresses of two or more SDMA clients, BAR control and information fields to each client, and acknowledgement response information such as block acknowledgement transmission time or transmission sequence.

Figure 7F:
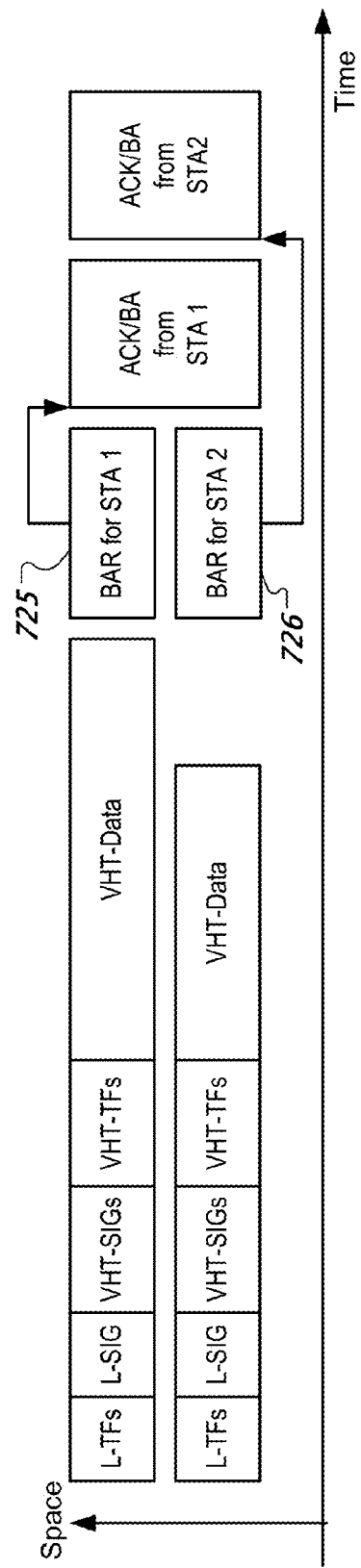

As shown in FIG. 7F, instead of sending an aggregated BAR as depicted by FIG. 7E, an access point can transmit separate BARs 725, 726 to SDMA clients concurrently by SDMA based communications. A BAR 725, 726 can include acknowledgement response information such as a response transmission time or a transmission sequence information. After an end of VHT-Data transmissions, the access point can perform steered transmissions of BARs to respective clients at the same time. In this example, a BAR for a first client indicates a start of a first acknowledgement response time, whereas a BAR for a second client indicates a start of a second acknowledgement response time which is subsequent to the first acknowledgement period.

FIGS. 8A, 8B, 8C, 8D, 8E, 8F, 8G, 8H, 8I, 8J, and 8K show examples of communication flow layouts that include MAC scheduled acknowledgement information that is based on space division multiple access communications. An access point can transmit acknowledgement schedules via one or more fields associated with a MAC layer.

As shown in FIG. 8A, an access point performs omni-directional transmissions and steered transmissions. In the steered transmissions, an access point transmits a first VHT-Data 805 to a first client and a second VHT-Data 806 to a second client. The first and second VHT-Data 805, 806 can include respective PPDUs. The first and second VHT-Data 805, 806 can include respective MAC headers. The access point can use a MAC header field such as a duration field to carry acknowledgement response transmission time information for clients to acknowledgement respective VHT-Data 805, 806.

In some implementations, acknowledgement response transmission time information includes the offset between the end of a PPDU and an expected acknowledgement response transmission time. In some implementations, acknowledgement response transmission time information indicates a duration of a SIFS before an expected acknowledgement response transmission time. In some implementations, an access point selects the longest PPDU included in the steered transmissions to determine an expected acknowledgement response transmission time.

As shown in FIG. 8B, an access point performs omni-directional transmissions and steered transmissions. The access point uses a first acknowledgement policy for a first client and a second acknowledgement policy for a second client. The access point can solicit an immediate response 810 from one SDMA client by setting an ACK policy as an implicit ACK. The access point can solicit immediate responses 811 from two or more additional SDMA clients by setting an ACK policy as SDMA immediate ACK. A duration of a SIFS can separate immediate responses 810, 811.

In some implementations, an implicit ACK policy setting can be modified to a SDMA immediate ACK policy setting. SDMA clients can differentiate a SDMA immediate ACK from an implicit ACK based on a SDMA preamble. In some implementations, SDMA clients differentiate policies based on a SDMA indication in a VHT-SIG or a MAC header.

In some implementations, a Power Save Multi-Poll (PSMP) field such as "No Explicit/PSMP ACK" can be modified to a SDMA immediate ACK policy setting. If PSMP is not used, e.g. no PSMP UTT assignment, a SDMA immediate ACK can be followed; otherwise, PSMP ACK can be followed.

In some implementations, a VHT-SIG can include a SDMA immediate ACK indication to indicate a SDMA immediate ACK policy to a client. In some implementations, a MAC header can include a SDMA immediate ACK indication to indicate a SDMA immediate ACK policy to a client.

As shown in FIG. 8C, an access point uses different VHT-Data MAC duration values 815, 816 to signal different times for acknowledgement responses. The access point uses a first VHT-Data MAC duration value 815 to indicate an end of a corresponding acknowledgement response for a first client. The access point uses a second, longer VHT-Data MAC duration value 816 to indicate an end of a corresponding acknowledgement response for a second client. A client uses a VHT-Data MAC duration value 815, 816 to determine an acknowledgement response starting time. For example, a client calculates a response starting time based on received a VHT-Data MAC duration value minus the time required to transmit a response frame.

The access point can calculate and transmit a VHT-Data MAC duration value. Calculating such as value can include estimating the duration of a response frame by using a primary response transmission rate and the size of response frame. A client can use the same primary response transmission rate and size of a response frame to calculate a duration of a response frame and determine the response starting time. A client can start a transmission of an acknowledgement response based on a calculated response starting time. The client can complete the transmission before the response ending time, which can be indicated by a VHT-Data MAC duration of a received frame.

In some implementations, an access point uses a VHT-Data MAC duration value to indicate the start of a corresponding immediate response. A client can calculate a response starting time based on such a duration value plus a duration of a SIFS. Based on the access point transmitting different duration values to respective clients, the clients determine different starting times for their respective acknowledgement responses.

As shown in FIG. 8D, an access point controls a first client to use an implicit ACK policy and a second client to use a different policy. The first client transmits an acknowledgement response 820 based on the end of a received frame. The first client can complete transmission within a response duration. In some implementations, a response duration is calculated based on a primary response rate and a size of a response frame. An acknowledgement response can include a MAC Duration to indicate an end of immediate responses. The second client can determine a starting time of an acknowledgement response 821 based on a VHT-Data MAC duration.

Figure 8E:
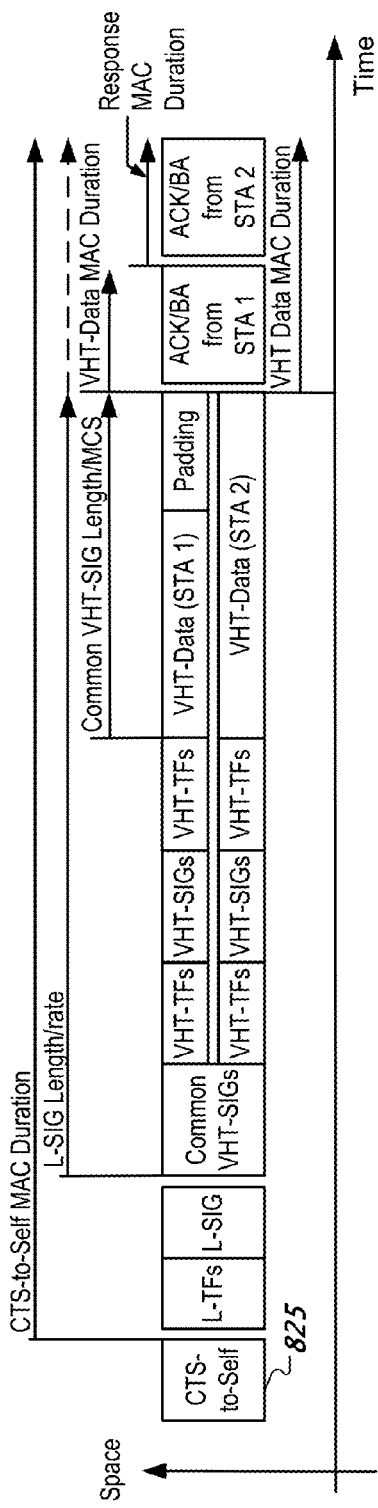

As shown in FIG. 8E, an access point can use a MAC duration to carry ACK scheduling information. A CTS-to-Self 825 can be used to indicate a duration of a transmission sequence. The duration can be based on a longest transmission sequence. In some implementations, a CTS-to-Self can be used to indicate an end of a transmission sequence. In some implementations, a CTS-to-Self can be used to indicate a duration of a Transmission Opportunity (TXOP). In some implementations, a client sets an acknowledgement response duration field based on a CTS-to-Self duration. In some implementations, a L-SIG can be used to indicate the duration of a transmission sequence. In some implementations, a client sets an acknowledgement response duration field based on a duration indicated by a L-SIG.

Figure 8F:
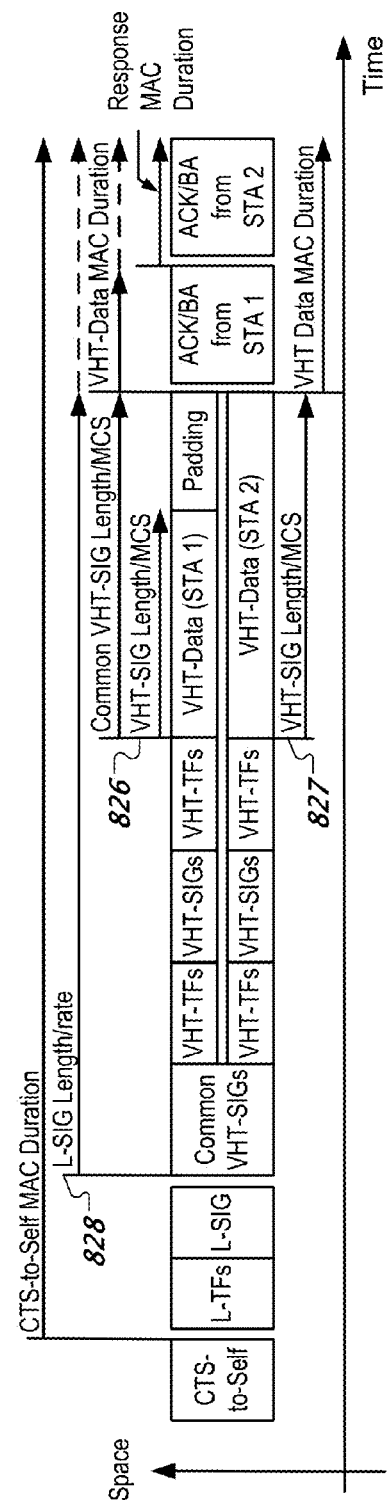

As shown in FIG. 8F, an access point can transmit VHT-Data segments that have different lengths. The access point can transmit a first VHT-SIG length value 826 to a first client via a first spatial wireless channel. The access point can transmit a second, longer VHT-SIG length value 827 to a second client via a second spatial wireless channel. A common VHT-SIG length value 828 can indicate an end of a PPDU having the maximum length in a group of steered transmissions. A PPDU can include a VHT-Data segment. If required, a PPDU can include padding. The access point can transmit a first VHT-Data MAC duration that indicates the end of all immediate responses to a first client. The access point can transmit a second VHT-Data MAC duration that indicates the end of a corresponding immediate response to a second client. For a third client (not shown), the access point can transmit a third VHT-Data MAC duration that indicates the end of a corresponding immediate response to the third client.

As shown in FIG. 8G, an access point can use a MAC header field such as a TXOP limit in a QoS control field or a VHT control field to carry ACK scheduling information. In some implementations, ACK scheduling is based on the time offset from the end of a PPDU to a starting time of an acknowledgement response 830. In some implementations, a MAC duration is used to indicate a duration or end of a transmission sequence or a TXOP. A client can determine an acknowledgement duration based on a MAC duration in a received SDMA frame.

As shown in FIG. 8H, an access point can use a MAC padding delimiter to carry response scheduling information. The access point can include a MAC padding delimiter 840, 841 in each SDMA PPDU. A PPDU can include one or more MPDUs. A MPDU length can be used to signal response scheduling. In some implementations, a MAC padding delimiter 840, 841 has a pre-determined duration.

Figure 8I:
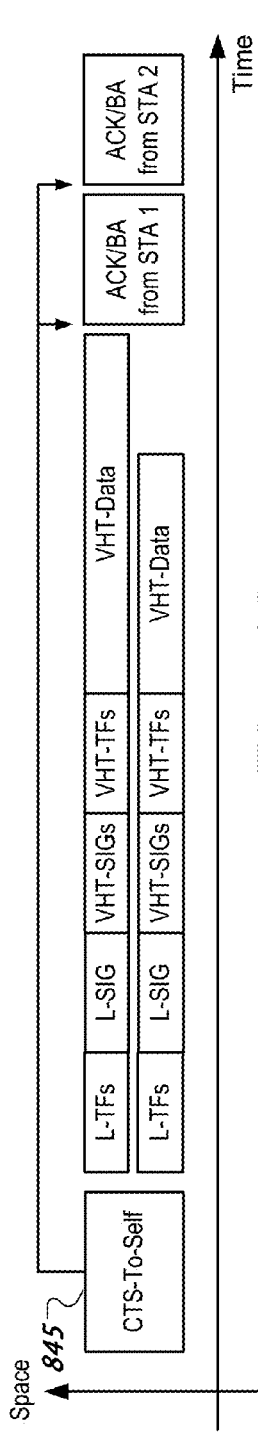

As shown in FIG. 8I, an access point can perform an omni-directional transmission of a CTS-To-Self 845 to multiple clients that is followed by steered transmissions to the clients. A CTS-To-Self 845 can include acknowledgement response transmission time information for multiple SDMA clients. In some implementations, acknowledgement response transmission time information can include an offset between the end of the CTS-to-Self 845 and an expected acknowledgement response transmission time. In some implementations, acknowledgement response transmission time information can include an offset between the end of the longest PPDU and an expected acknowledgement response transmission time.

Figure 8J:
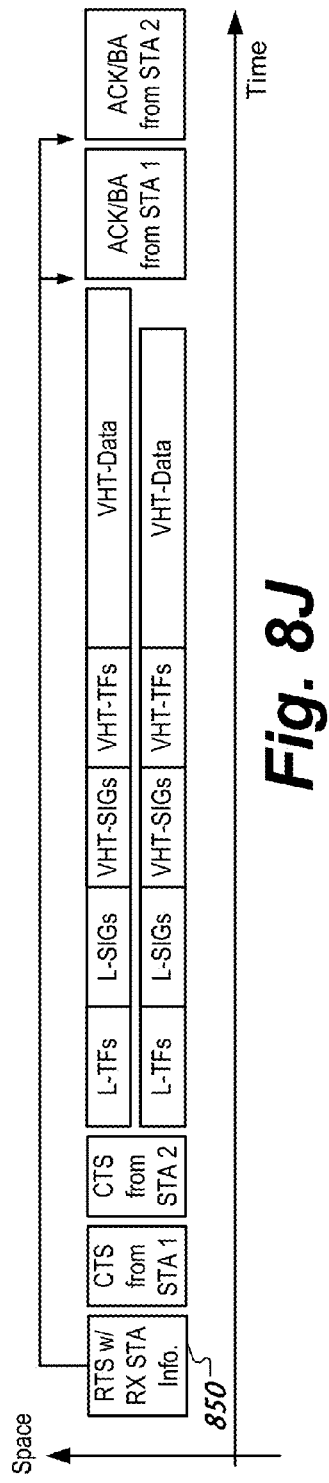

As shown in FIG. 8J, an access point can perform an omni-directional transmission of a Request to Send (RTS) 850 that includes acknowledgement response transmission time information for each of the SDMA clients.

Figure 8K:
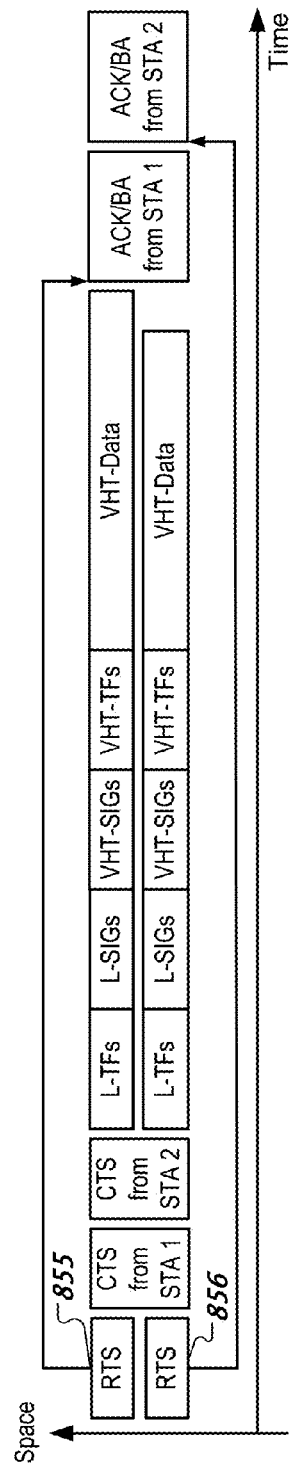

As shown in FIG. 8K, an access point can perform multiple steered transmissions of RTSs 855, 856. The steered transmissions include a first RTS 855 to a first client and a second RTS 856 to a second client. The RTSs 855, 856 include different acknowledgement response transmission time values that cause the clients to selectively start transmission of an acknowledgement response at different times.

FIGS. 9A, 9B, 9C, 9D, and 9E show examples of communication flow layouts that include PHY scheduled acknowledgement information that is based on space division multiple access communications.

As shown in FIG. 9A, an access point can begin steered transmissions 905, 906 at a beginning of a SDMA frame. The access point uses L-SIGs 907, 908, in two or more steered transmissions 905, 906, to carry acknowledgement response transmission time information to two or more clients. The access point can use different spatial wireless channels to carry two or more acknowledgement response transmission time values to two or more respective clients.

In some implementations, an access point uses the length and data rate fields of a L-SIG to carry the acknowledgement response transmission time information. Acknowledgement response transmission time information can include a value of an offset between the end of L-SIG and an expected acknowledgement response transmission time. In some implementations, an acknowledgement response transmission time information is based on the end of the last transmission before an expected acknowledgement response transmission, e.g., a SIFS before an expected acknowledgement response transmission time. The clients can set a PHY Clear Channel Assessment (PHY-CCA) to be busy until the end of a L-SIG period that is indicated by received L-SIG length and data rate values.

As shown in FIG. 9B, an access point's transmissions can include omni-directional transmissions and steered transmissions. The access point uses VHT-SIGs 910, 911, in two or more steered transmissions, to carry acknowledgement response transmission time information. Acknowledgement response transmission information can indicate a time offset between the end of VHT-SIGs 910, 911 and an expected acknowledgement response transmission time. In some implementations, acknowledgement response transmission information can indicate the time offset between the end of the longest PPDU and an expected acknowledgement response transmission time. In some implementations, the end of a PPDU includes a SIFS duration. A client can transmit an acknowledgement response as a response to a SDMA transmission. In some implementations, a client can complete a transmission of a response frame within a fixed duration that is common to multiple clients.

In some implementations, acknowledgement response transmission information can include an acknowledgement response transmission sequence. An access point can use a 4-bit information field to control up to 16 SDMA clients. In some implementations, SDMA clients are allocated the same size acknowledgement response transmission slot and the same data rate. In some implementations, the lowest commonly supported rate among multiple SDMA clients is used to calculate a slot size. A L-SIG can signal the starting point of the acknowledgement response sequence, which can be the end of the longest PPDU plus a SIFS duration.

As shown in FIG. 9C, an access point can use MAC padding 915 to ensure that two or more SDMA PPDUs/PSDUs have the same duration. The access point can use a common VHT-SIG length value to indicate an end or a duration of multiple PPDUs. In some implementations, a VHT-SIG MCS is set to the MCS of a corresponding PSDU, whereas the size of the PSDU can be derived by the VHT-SIG MCS and a common PPDU and PSDU duration. An access point can use different VHT-SIG length values to cause different starting times of acknowledgement responses. For example a client can use a received VHT-SIG length value and a VHT-SIG MCS to calculate a starting time of a corresponding immediate response.

In some implementations, a client starts a transmission on or after a response starting time and ends one or more transmissions within a response duration. In some implementations, a response duration is calculated by a primary response rate and a size of response frame. In some implementations, an access points controls one SDMA client to follow an implicit ACK policy. In some implementations, an access point can use a VHT-SIG length to indicate the size of a corresponding PSDU.

As shown in FIG. 9D, an access point can perform a omni-directional transmission of a CTS-to-Self 920 with a CTS-To-Self MAC duration that indicates the end of multiple immediate responses, e.g., end of two or more acknowledgement responses from two or more SDMA clients. To a first client, the access point can send a VHT-SIG length field that indicates an end of a maximum length PPDU, which can be inclusive of MAC padding. To a second client, the access point can send a VHT-SIG length field that indicates a start of a corresponding immediate response.

Figure 9E:
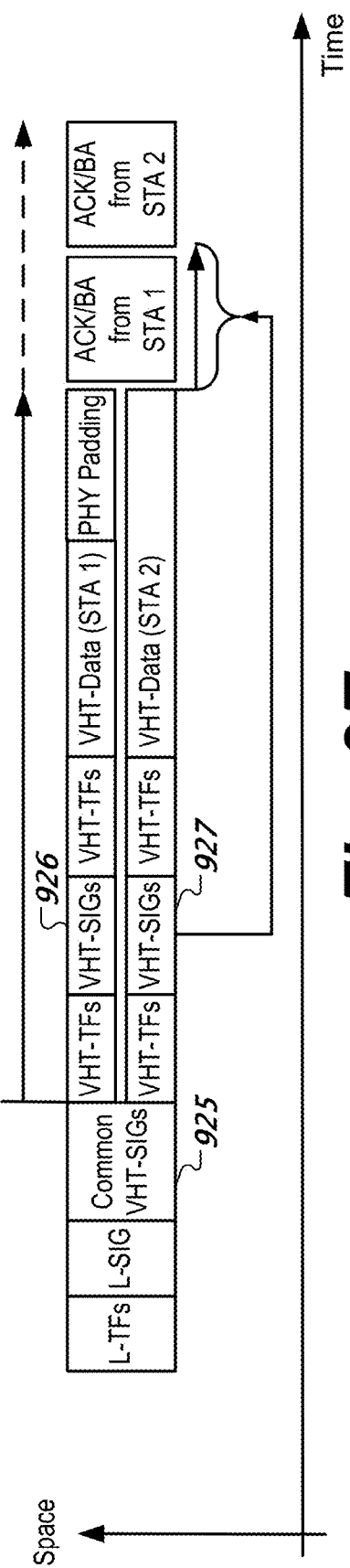

As shown in FIG. 9E, an access point can perform a omni-directional transmission of one or more common VHT-SIGs 925. A field such as a length or duration field in a common VHT-SIG 925 can indicate the end of two or more SDMA PPDUs. In some implementations, such a field can indicate the end of two or more immediate responses. A response scheduling field can be included in two or more steered VHT-SIGs 926, 927 to indicate corresponding acknowledgement response starting times, respectively. In some implementations, a corresponding response starting time is offset from the end of two or more SDMA PPDUs. In some implementations, a corresponding response starting time is offset from the end of two or more immediate responses.

FIG. 10 shows an example of a communication flow layout that includes immediate response scheduling information. An access point can include an immediate response scheduling information 1005 into a VHT-SIG 1010 for a first client. The access point can include an immediate response scheduling information 1015 into a VHT-SIG 1020 for a second client. In some implementations, a MAC header can include an immediate response scheduling field. Immediate response scheduling information 1005, 1015 can indicate a response starting time, a respond duration, or both. If the access point does not receive an expected immediate response from a SDMA client with an active block ACK agreement, the access point can send a BAR to request a response instead of retransmitting data immediately. The access point can include a common response duration 1030 in one or more common VHT-SIGs 1035

In some implementations, an access point includes a response starting time in one or more of VHT-SIG or MAC header. A client can start a transmission on or after a response starting time. In some implementations, the client is required to end the one or more transmissions within a response duration. In some implementations, a response duration is calculated by a primary response rate and a size of an expected response frame.

In some implementations, an access point includes a response starting time or a response sequence in a VHT-SIG. An access point can include a common response duration in one or more common VHT-SIGs. A client can start one or more transmissions following a response starting time or a response sequence. The client can complete one or more transmissions within a common response duration. In some implementations, a response sequence is 2 bits. A 2-bit response sequence can support four SDMA clients. In some implementations, a response sequence is 3 bits or longer. A 3-bit response sequence can support eight SDMA clients. In some implementations, an access point includes a response starting time or a response sequence in a MAC header.

In some implementations, an access point includes an individual response starting time and an individual response duration in a VHT-SIG, MAC header, or both. A client can start a transmission following a response starting time and can complete the transmission within the individual response duration. Individualized values can be transmitted via steered communications.

In some implementations, an access point includes a information such as a response starting time or a response sequence in a VHT-SIG, MAC header, or both. An access point and clients can follow a fixed common response duration. In some implementations, a fixed common response duration is calculated by a lowest response rate and a size of basic or compressed Block ACK frame. A client can start one or more transmissions following a response starting time or a response sequence. The client can complete the one or more transmissions within a fixed common response duration.

In some implementations, if a SDMA transmission sequence is protected by a MAC mechanism (e.g., a CTS-to-Self or a RTS/CTS exchange) or a PHY mechanism (e.g., L-SIG TXOP), a client can complete a response transmission earlier than an expected ending time. The last immediate responder can be allowed to complete transmissions after the expected ending time of a response frame.

An access point can monitor for multiple acknowledgement responses in a shared wireless medium from participating clients. If an immediate response is not received as expected, the medium may be idle until the next scheduled response, e.g., the next acknowledgement response, which creates a gap. A nonparticipating client may interpret the gap to mean that the nonparticipating client can start a transmission in the shared wireless medium. However, starting an unrelated transmission may interfere with a transmission of an acknowledgement response from another participating client.

If the access point determines that an acknowledgement response has not been received, then the access point can transmit a signal to continue a protection of a wireless medium from nonparticipating wireless communication devices. The access point can send a message such as a BAR to poll the next client to start transmission of an acknowledgement response.

In some implementations, an access point can reserve a wireless medium for a period of time, e.g., TXOP. In this period of time, the access point can monitor for acknowledgement responses. If the wireless medium is idle for a predetermined amount of time (e.g., point coordination function (PCF) interframe space (PIFS)), a TXOP holder can transmit a signal containing a BAR or data to poll. The signal can be indicative of an address of the next client that is expected to transmit an acknowledgement response.

In some cases, a BAR is shorter than an expected acknowledgement response such as a block acknowledgement which can create a transmission gap if additional responses are expected. In some cases, the data to poll are longer than an expected acknowledgement response which can create a collision if one or more expected acknowledgement responses are remaining. Moreover, one or more clients can be hidden from each other, therefore, a delayed acknowledgement response from a client may not cause a busy medium around another client, which may cause one or more collisions at the access point.

FIGS. 11A, 11B, 11C, 11D, 11E, 11F, 11G, and 11H show examples of transmission sequences based on multi-user response recovery. An access point can schedule acknowledgement responses for four or more clients (e.g., STA 1, STA 2, STA 3, and STA 4).

As shown in FIG. 11A, an access point can initially schedule acknowledgement responses for four or more clients in a first protection period such as a first Net Allocation Vector (NAV) period 1101. Based on a lack of reception of a response from STA 2, the access point can send a BAR to STA 3 which indicates a second NAV period 1102. In some implementations, when the wireless medium is idle for a duration of PIFS, a TXOP holder can send a BAR to the next immediate responder. When receiving a BAR before a scheduled response, one or more subsequent responders can cancel their respective scheduled responses. The next immediate responder can send an acknowledgement response based on receiving the BAR. One or more remaining responders can wait for their own BARs before sending an acknowledgement response.

As shown in FIG. 11B, an access point transmits a padded BAR 1105 to preserve an initially scheduled sequence of acknowledgement responses from respective clients. In some implementations, if the access point does not receive an acknowledgement response (e.g., a BA) within a duration of PIFS, then the access point can transmit a padded BAR 1105. In some cases, a BAR can be shorter than a missed BA. The access point can add padding to the BAR. For example, a BAR can be padded to the end of a missed BA. In some implementations, a BAR with a lower rate than an originally planned rate can be used. Note that the corresponding BA can use a lower rate, the end of the BA can be earlier than the next BA, which can be based on a duration of a Reduced Inter-Frame Spacing (RIFS).

Figure 11C:
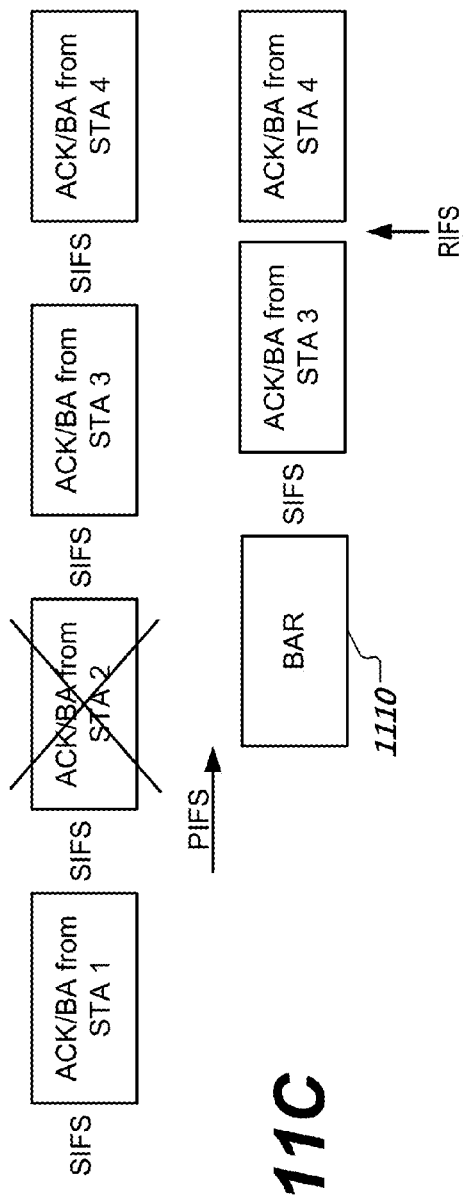

As shown in FIG. 11C, an access point transmits a BAR 1110 that is longer than a duration of a missed acknowledgement response. Instead of a duration of SIFS between acknowledgement responses, a shorter duration (e.g., RIFS) is used between remaining acknowledgement responses that are to be transmitted after the BAR 1110.

Figure 11D:
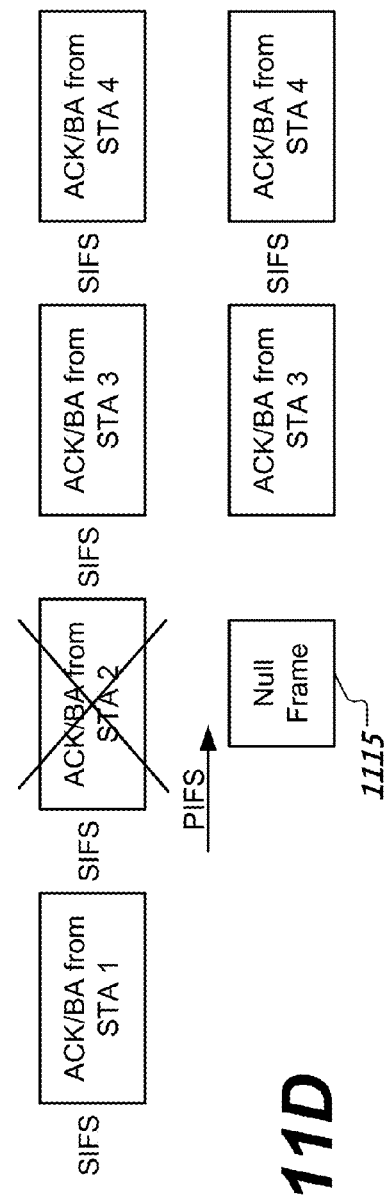

As shown in FIG. 11D, an access point transmits a null frame 1115 after detecting a missed acknowledgement response. In some implementations, when a wireless medium is idle for PIFS, the access point can send a null frame 1115 to keep the wireless medium busy until the end of a missed BA. In some implementations, the access point can send the null frame 1115 earlier (e.g., 9 microseconds earlier) than the end of the missed BA. In some implementations, a null frame 1115 is a data frame with one or more Zero-Length-Delimiters in a payload. In some implementations, a null frame 1115 includes a null signal which can be part of a frame, e.g., part of a preamble. Subsequent BAs after the missed BA can keep the original schedule. In some implementations, the shortest null frame duration is 19 microseconds; and the longest null frame duration is 55 microseconds.

Figure 11E:
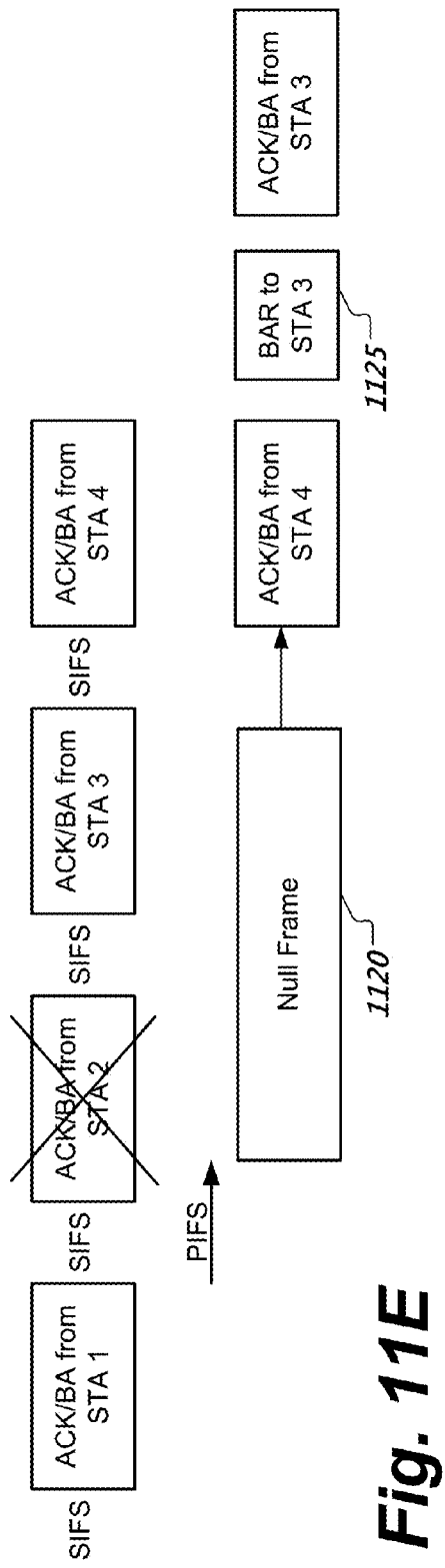

As shown in FIG. 11E, an access point transmits a null frame 1120 that is extended to match the end of the next scheduled acknowledgement response. If the access point cannot complete a shortest null frame before the end of the missed BA, the access point can extend the null frame 1120 until the end of the next scheduled BA. The next responding client, when receiving the null frame 1120 can cancel a scheduled response. In some implementations, the next responding client can cancel a scheduled response based on detecting a busy channel. Subsequent BAs after the next scheduled BA can keep the original schedule. After the scheduled responses, the access point can send a BAR 1125 to a client that experienced a canceled acknowledgement response.

Figure 11F:
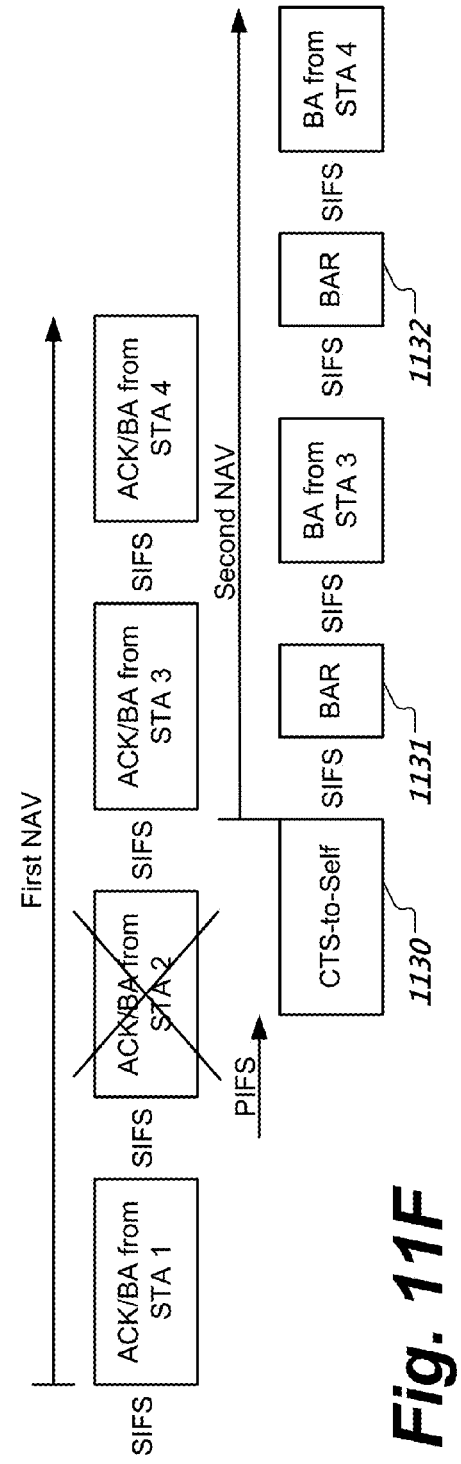

As shown in FIG. 11F, an access point is expecting acknowledgement responses in a first protection period, e.g., a first NAV. Based on a lack of reception of an acknowledgement response, the access point transmits a CTS-to-Self 1130 to create a secondary protection period, e.g., a second NAV. The access point transmits BARs 1131, 1132 to solicit acknowledgement responses from remaining clients, respectively.

In some implementations, when a BA is missed, multi-user acknowledgement responses may fall back to a BAR-polling based approach. When a wireless medium is idle for a duration of PIFS, an access point can send a CTS-to-Self frame to cancel one or more subsequent scheduled responses. A CTS-to-Self frame can indicate a new NAV that is covering to the end of the last response.

A CTS-to-Self frame sent to cancel responses can be referred to as a cancellation frame. When receiving such a cancellation frame, a subsequent responding client can cancel a scheduled response and wait for a BAR. The immediate subsequent responding client (e.g., a client with a scheduled BA within 40 microseconds after the cancellation frame or before the end of the cancellation frame) can send a BA after the cancellation frame without explicit polling.

Figure 11G:
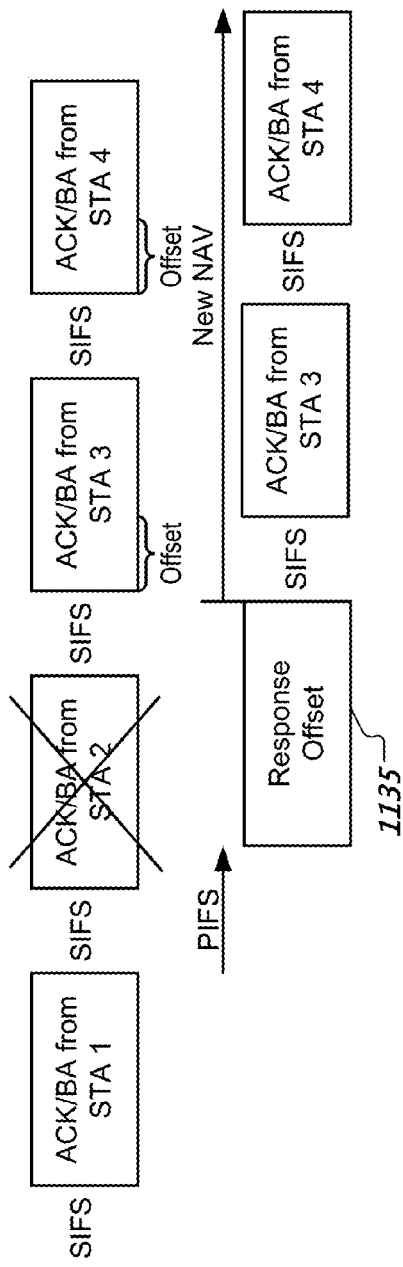

As shown in FIG. 11G, an access point transmits a response offset 1135 based on a missed acknowledgement response. A response offset 1135 can signal an offset value between a new response schedule and an old response schedule. In some cases, the offset value is positive if the end of the response offset frame is later than the end of the missed BA. In some cases, the offset value is negative if the end of the response offset frame is earlier than the end of the missed BA. In some implementations, a response offset 1135 can be formatted long enough and be transmitted by the lowest rate such that the response offset 1135 is longer than the missed BA, and the offset value is positive. The response offset 1135 can indicate a new NAV that covers to the end of the last response based on a new schedule. When receiving a response offset 1135, one or more responding clients that are scheduled after the missed BA can advance or delay their responses based on an offset value indicated by the response offset 1135.

Figure 11H:
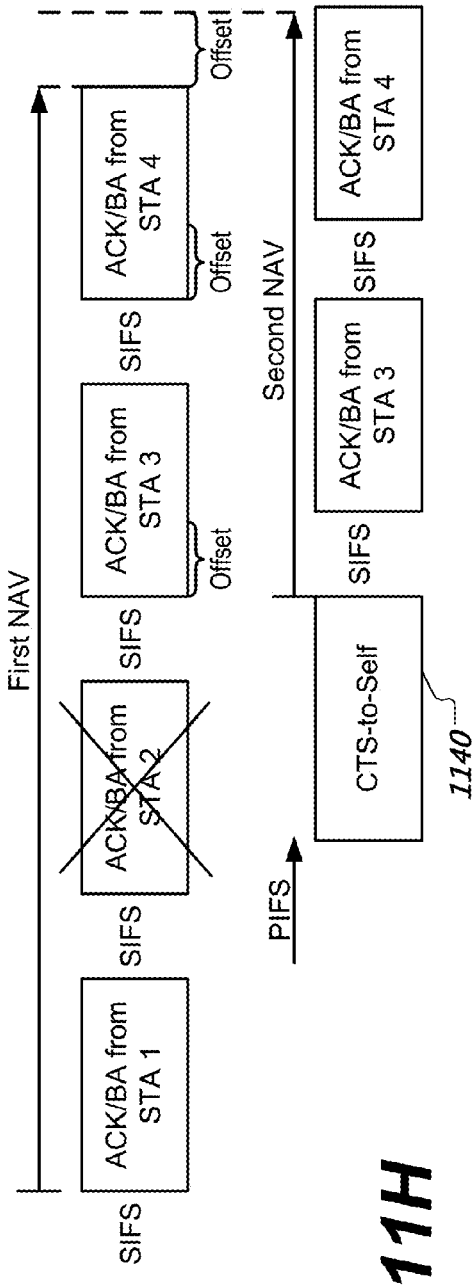

In FIG. 11H, an access point is expecting acknowledgement responses in a first protection period, e.g., a first NAV. Based on a lack of reception of an acknowledgement response, the access point transmits a CTS-to-Self 1140 to create a secondary protection period, e.g., a second NAV. A first NAV can be indicated by one or more of: RTS-CTS exchange, L-SIG, or MAC duration in SDMA data. A CTS-to-Self 1140 can signal the second NAV covering to the end of the last response based on a new schedule that accounts for a missed acknowledgement response.

In some implementations, when receiving a CTS-to-Self 1140 in a missed acknowledgement response scenario, one or more remaining clients can calculate a response offset between the second NAV and the first NAV. Such clients can advance or delay their responses based on a calculated response offset. In some implementations, a duration field of a CTS-to-Self can signal a response offset. An offset can be positive or negative, if the end of a CTS-to-Self is earlier than the end of a missed BA, another CTS-to-Self or a BAR can be sent.

In some implementations, if an immediate subsequent response is the last scheduled response, an access point can directly send a BAR to elicit the last response. The last responding client can cancel the original schedule and can send a BA based on a received BAR.

Clients addressed by a SDMA frame, e.g., a multi-user (MU) frame that includes multiple steered communications, can send responses sequentially. In some implementations, a response sequence is based on a MU group member index. In some implementations, a response sequence is based on a response sequence field in a preamble or a MAC header. One or more clients can count the number of received frames after a MU based PPDU to determine when to send an acknowledgement response. In some implementations, one or more clients can count the number of received L-SIGs after a MU based PPDU to determine when to send an acknowledgement response. However, in a hidden terminal scenario, clients may not be able to receive each other's transmissions.

Before enabling sequential MU responses to a MU frame, an access point can request that MU clients conduct a mutual reachability check. For example, a MU client can check whether the client can receive a signal correctly from the other MU clients. The MU client can report MU group reachability information to the access point. Based on the MU group reachability check, the access point can arrange the sequence of MU responses.

FIG. 12A shows an example of a communication flow layout associated with a multi-user reachability check process. The MU group reachability check process includes a testing stage 1205 and a reporting stage 1210. During the testing stage 1205, one or more clients are requested to send a testing message based on a technique such as polling, scheduling, or a predetermined sequential ordering; other clients attempt to receive the testing message. During the reporting stage 1210, one or more clients are requested to report to the access point the reachability information. In some implementations, a testing frame and a report frame are aggregated into a combined frame 1230 includes a MU-reach test frame and a response frame, which includes reachability information.

In some implementations, a multi-user reachability check process includes one or more MU transmission periods with polled or scheduled responses and a reporting period for reporting responses. In some implementations, a multi-user reachability check process includes two or more MU transmission periods with polled or scheduled responses. Such responses can include a MU reachability report and a response to a MU transmission. In some implementations, a MU reachability report can include a 4-bit bitmap corresponding to the group member indices of four devices. In the bitmap, when a bit is set to one, a frame from a corresponding group member device can be received; otherwise the group member device is a hidden terminal.

In some implementations, a MU transmission and a response sequence used for MU reachability testing and reporting can be a sounding and feedback sequence. In some implementations, a MU transmission and a response sequence used for MU reachability testing and reporting can be a group identifier (GID) assignment and confirmation sequence.

FIG. 12B shows an example of a communication flow layout based on a multi-user reachability information. Based on MU clients' mutual reachability reports, an access point can arrange a sequence MU responses 1255, 1260, 1270, 1275 to a SDMA based MU transmission 1250. The clients that can hear the transmissions from a portion of the group members can be controlled to send responses earlier to the MU transmission 1250 (e.g., RESP #1), whereas clients that can hear the transmissions from most or all group members can be controlled to send responses later (e.g., RESP #3). If sequential responses for multiple clients cannot be arranged due to two or more hidden terminal problems, those clients that cannot be received by other clients can be polled or scheduled for responses. For example, the access point can transmit a poll 1280 to control a group member to send a response 1275.

In some wireless communication systems, SDMA is used on the uplink between the clients and the access point. For example, multiple clients can use SDMA to concurrently acknowledgement responses to an access point.

FIG. 13A shows an example of a communication flow layout that includes downlink and uplink SDMA communications. Downlink SDMA clients can establish uplink SDMA channels with an access point. Response frames 1305, 1310 from different downlink SDMA clients are transmitted after the longest SDMA based PPDU by using uplink SDMA. SDMA based PPDUs can be padded to have the same length. The response frames 1305, 1310 can include acknowledge responses to data received in respective PPDUs.

In some implementations, RTS's are transmitted to SDMA clients by using downlink SDMA, whereas CTS's are returned from SDMA clients by using uplink SDMA. CTS scheduling can be used. In some implementations, an additional CTS-to-Self is used with a SDMA-transmitted RTS.

FIG. 13B shows another example of a communication flow layout that includes downlink and uplink SDMA communications. Downlink SDMA clients can receive data concurrently from an access point via two or more downlink spatial wireless channels. The clients can send acknowledgement responses 1320, 1325 to the access point via uplink spatial wireless channels. The access point can send a CTS-to-Self 1330 which can indicate a CTS-to-self MAC duration. A L-SIG length can indicate the end of the longest immediate response. The access point can transmit separate VHT-SIG length values that represent lengths of VHT-Data frames that are addressed to two or more clients respectively.

The techniques and packet formats described herein can be compatible with various packet formats defined for various corresponding wireless systems such as one based on IEEE 802.11ac. For example, various wireless systems can be adapted with the techniques and systems described herein to include signaling related to sounding via multiple clients and signaling of a SDMA frame.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method, comprising:
transmitting a multi-user frame, in a frequency band, that concurrently provides data via spatially steered streams to a group of wireless communication devices;

monitoring for acknowledgements, in the frequency band, to respective portions of the multi-user frame;

detecting, after the transmitting of the multi-user frame, a lack of reception of an expected acknowledgement from a first device of the wireless communication devices based on a first protection period after the multi-user frame; and transmitting, based on the lack of reception of the expected acknowledgement, a signal in the frequency band to (i) create a second protection period to prevent a wireless communication device that is separate from the group of wireless communication devices from interrupting a sequence of acknowledgements associated with the multi-user frame, and (ii) control transmission of an acknowledgement from a second device of the wireless communication devices during the second protection period, the signal being addressed to the second device, wherein the second protection period extends protection of a wireless medium from the first protection period.

2. The method of claim 1, wherein the signal comprises a block acknowledgement request.

3. The method of claim 1, wherein the acknowledgement from the second device is originally scheduled to be sent after the expected acknowledgement from the first device, wherein the signal reschedules the acknowledgement from the second device.

4. The method of claim 1, comprising:
transmitting, in the frequency band, one or more block acknowledgement requests to one or more devices in the group of wireless communication devices to control transmission of block acknowledgements from the one or more devices in the frequency band.

5. The method of claim 1, comprising:
transmitting first response scheduling information to cause the first device to transmit a first acknowledgement during a first portion of an acknowledgement period; and transmitting second response scheduling information to cause the second device to transmit a second acknowledgement during a second, subsequent portion of the acknowledgement period, wherein the expected acknowledgement comprises the first acknowledgement.

6. The method of claim 5, comprising:
controlling the group of the wireless communication devices to perform reachability testing, wherein the reachability testing comprises determining whether a signal emanating from the first device is at least received by the second device; and generating an acknowledgement response schedule based on the reachability testing, wherein the first response scheduling information and the second response scheduling information are based on the acknowledgement response schedule.

7. The method of claim 1, wherein transmitting the multi-user frame comprises:
transmitting a first packet data unit (PDU) of a medium access control (MAC) layer to the first device via a first spatial wireless channel, wherein the first PDU comprises first information that causes the first device to selectively transmit an acknowledgement in a first period; and transmitting a second PDU of the MAC layer to the second device via a second spatial wireless channel, wherein the second PDU comprises second information that causes the second device to selectively transmit an acknowledgement in a second period that is subsequent to the first period.

8. A system, comprising:
transceiver electronics to communicate with a group of wireless communication devices; and
processor electronics configured to:
control a transmission of a multi-user frame, in a frequency band, that concurrently provides data via spatially steered streams to the group of wireless communication devices, monitor for acknowledgements, in the frequency band, to respective portions of the multi-user frame, detect, after the transmission of the multi-user frame, a lack of reception of an expected acknowledgement from a first device of the wireless communication devices based on a first protection period after the multi-user frame; and control, based on the lack of reception of the expected acknowledgement, a transmission of a signal in the frequency band to (i) create a second protection period to prevent a wireless communication device that is separate from the group of wireless communication devices from interrupting a sequence of acknowledgements associated with the multi-user frame, and (ii) control transmission of an acknowledgement from a second device of the wireless communication devices during the second protection period, the signal being addressed to the second device, wherein the second protection period extends protection of a wireless medium from the first protection period.

9. The system of claim 8, wherein the signal comprises a block acknowledgement request.

10. The system of claim 8, wherein the acknowledgement from the second device is originally scheduled to be sent after the expected acknowledgement from the first device, wherein the signal reschedules the acknowledgement from the second device.

11. The system of claim 8, wherein the processor electronics are configured to control a transmission, in the frequency band, of one or more block acknowledgement requests to one or more devices in the group of wireless communication devices to control transmission of block acknowledgements from the one or more devices in the frequency band.

12. The system of claim 8, wherein the processor electronics are configured to control a transmission of a first response scheduling information to cause the first device to transmit a first acknowledgement during a first portion of an acknowledgement period, wherein the processor electronics are configured to control a transmission of a second response scheduling information to cause the second device to transmit a second acknowledgement during a second, subsequent portion of the acknowledgement period, and wherein the expected acknowledgement comprises the first acknowledgement.

13. The system of claim 12, wherein the processor electronics are configured to (i) control the group of the wireless communication devices to perform reachability testing, the reachability testing comprising determining whether a signal emanating from the first device is at least received by the second device, and (ii) generate an acknowledgement response schedule based on the reachability testing, wherein the first response scheduling information and the second response scheduling information are based on the acknowledgement response schedule.

14. The system of claim 8, wherein the multi-user frame comprises:
   a first packet data unit (PDU) of a medium access control (MAC) layer intended for the first device transmitted in a first spatial wireless channel, wherein the first PDU comprises first information that causes the first device to selectively transmit an acknowledgement in a first period; and
   a second PDU of the MAC layer intended for the second device transmitted in a second spatial wireless channel, wherein the second PDU comprises second information that causes the second device to selectively transmit an acknowledgement in a second period that is subsequent to the first period.

15. An apparatus, comprising:
   circuitry to control a transmission of a multi-user frame, in a frequency band, that concurrently provides data via spatially steered streams to a group of wireless communication devices; and
   circuitry to (i) monitor for acknowledgements, in the frequency band, to respective portions of the multi-user frame, (ii) detect, after the transmission of the multi-user frame, a lack of reception of an expected acknowledgement from a first device of the wireless communication devices based on a first protection period after the multi-user frame, and (iii) control, based on the lack of reception of the expected acknowledgement, a transmission of a signal in the frequency band to create a second protection period to prevent a wireless communication device that is separate from the group of wireless communication devices from interrupting a sequence of acknowledgements associated with the multi-user frame, and to control transmission of an acknowledgement from a second device of the wireless communication devices during the second protection period, the signal being addressed to the second device, wherein the second protection period extends protection of a wireless medium from the first protection period.

16. The apparatus of claim 15, wherein the signal comprises a block acknowledgement request.

17. The apparatus of claim 15, wherein the acknowledgement from the second device is originally scheduled to be sent after the expected acknowledgement from the first device, wherein the signal reschedules the acknowledgement from the second device.

18. The apparatus of claim 15, comprising:
   circuitry configured to control a transmission, in the frequency band, of one or more block acknowledgement requests to one or more devices in the group of wireless communication devices to control transmission of block acknowledgements from the one or more devices in the frequency band.

19. The apparatus of claim 15, comprising:
   circuitry configured to (i) control a transmission of a first response scheduling information to cause the first device to transmit a first acknowledgement during a first portion of an acknowledgement period, and (ii) control a transmission of a second response scheduling information to cause the second device to transmit a second acknowledgement during a second, subsequent portion of the acknowledgement period, wherein the expected acknowledgement comprises the first acknowledgement.

20. The apparatus of claim 15, wherein the multi-user frame comprises:
   a first packet data unit (PDU) of a medium access control (MAC) layer intended for the first device transmitted in a first spatial wireless channel, wherein the first PDU comprises first information that causes the first device to selectively transmit an acknowledgement in a first period; and
   a second PDU of the MAC layer intended for the second device transmitted in a second spatial wireless channel, wherein the second PDU comprises second information that causes the second device to selectively transmit an acknowledgement in a second period that is subsequent to the first period.

* * * * *